(12) United States Patent
Kimura

(10) Patent No.: US 10,451,874 B2
(45) Date of Patent: Oct. 22, 2019

(54) IMAGE DISPLAY DEVICE, METHOD OF CONTROLLING IMAGE DISPLAY DEVICE, COMPUTER PROGRAM, AND IMAGE DISPLAY SYSTEM

(71) Applicant: SEIKO EPSON CORPORATION, Tokyo (JP)

(72) Inventor: Fusashi Kimura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 479 days.

(21) Appl. No.: 14/471,333

(22) Filed: Aug. 28, 2014

(65) Prior Publication Data

US 2015/0084857 A1    Mar. 26, 2015

(30) Foreign Application Priority Data

Sep. 25, 2013 (JP) ................................ 2013-198132
May 30, 2014 (JP) ................................ 2014-112601

(51) Int. Cl.
*G06F 3/03* (2006.01)
*G02B 27/01* (2006.01)

(52) U.S. Cl.
CPC ............ *G02B 27/017* (2013.01); *G06F 3/03* (2013.01); *G02B 2027/014* (2013.01); *G02B 2027/0138* (2013.01); *G02B 2027/0178* (2013.01)

(58) Field of Classification Search
CPC .......... G02B 27/017; G02B 2027/0178; G02B 2027/0138; G02B 2027/014; G06F 3/03
See application file for complete search history.

(56) References Cited

U.S. PATENT DOCUMENTS

| 6,198,479 B1* | 3/2001 | Humpleman ....... H04L 12/2803 |
| | | 348/E5.006 |
| 6,346,929 B1 | 2/2002 | Fukushima et al. |
| 6,459,778 B1* | 10/2002 | Shirai ................. G06F 13/4072 |
| | | 379/93.05 |
| 8,120,580 B2* | 2/2012 | Yamaji .................. G06F 3/0482 |
| | | 345/156 |

(Continued)

FOREIGN PATENT DOCUMENTS

| EP | 1096793 A2 | 5/2001 |
| JP | H06-060025 A | 3/1994 |

(Continued)

OTHER PUBLICATIONS

May 26, 2016 Office Action Issued in U.S. Appl. No. 14/454,302.

(Continued)

*Primary Examiner* — Chanh D Nguyen
*Assistant Examiner* — Karin Kiyabu
(74) *Attorney, Agent, or Firm* — Oliff PLC

(57) ABSTRACT

An image display device includes a generating unit configured to generate an integrated image including first display regions where at least a part of a plurality of identification images for distinguishing a plurality of external devices connected to the image display device from one another are displayed as a list and a second display region where a display image, which is an image displayed by one external device selected out of the plurality of external devices, is displayed and an image display unit configured to cause a user of the image display device to visually recognize the integrated image.

12 Claims, 21 Drawing Sheets

(56) References Cited

U.S. PATENT DOCUMENTS

| | | | |
|---|---|---|---|
| 8,203,502 B1 | 6/2012 | Chi et al. | |
| 9,536,493 B2* | 1/2017 | Cheon | G09G 3/002 |
| 2004/0051719 A1* | 3/2004 | Fukui | G06F 3/011 |
| | | | 345/660 |
| 2008/0088646 A1 | 4/2008 | Sako et al. | |
| 2008/0165152 A1* | 7/2008 | Forstall | G06F 1/1626 |
| | | | 345/173 |
| 2008/0195961 A1* | 8/2008 | Bae | G06F 3/0481 |
| | | | 715/769 |
| 2009/0102798 A1* | 4/2009 | Fujita | G06F 3/023 |
| | | | 345/168 |
| 2009/0195513 A1* | 8/2009 | Dybalski | G06F 3/0488 |
| | | | 345/173 |
| 2010/0079356 A1 | 4/2010 | Hoellwarth | |
| 2010/0138780 A1* | 6/2010 | Marano | G06F 3/1415 |
| | | | 715/804 |
| 2010/0185955 A1 | 7/2010 | Kato et al. | |
| 2010/0259464 A1* | 10/2010 | Chang | G06F 3/1454 |
| | | | 345/2.3 |
| 2010/0261507 A1* | 10/2010 | Chang | G06F 3/1454 |
| | | | 455/566 |
| 2010/0262673 A1* | 10/2010 | Chang | G06F 3/1454 |
| | | | 709/217 |
| 2011/0037851 A1* | 2/2011 | Kim | G06F 3/04847 |
| | | | 348/143 |
| 2011/0199389 A1* | 8/2011 | Lu | G06F 3/017 |
| | | | 345/619 |
| 2011/0268218 A1* | 11/2011 | Kang | G06F 3/0482 |
| | | | 375/295 |
| 2011/0283334 A1* | 11/2011 | Choi | G06F 3/04883 |
| | | | 725/148 |
| 2012/0092277 A1* | 4/2012 | Momchilov | G06F 3/038 |
| | | | 345/173 |
| 2012/0159472 A1* | 6/2012 | Hong | H04W 4/21 |
| | | | 717/178 |
| 2012/0194428 A1 | 8/2012 | Kwon et al. | |
| 2012/0242677 A1 | 9/2012 | Kobayashi | |
| 2012/0293396 A1 | 11/2012 | Sako et al. | |
| 2012/0299950 A1* | 11/2012 | Ali | G02B 27/0176 |
| | | | 345/592 |
| 2012/0302289 A1 | 11/2012 | Kang | |
| 2013/0002701 A1 | 1/2013 | Ida | |
| 2013/0088450 A1 | 4/2013 | Takase et al. | |
| 2013/0169556 A1 | 7/2013 | Kim et al. | |
| 2013/0171940 A1 | 7/2013 | Miki et al. | |
| 2013/0285887 A1 | 10/2013 | Sako et al. | |
| 2013/0297839 A1* | 11/2013 | Chai | G06F 13/385 |
| | | | 710/62 |
| 2013/0314303 A1* | 11/2013 | Osterhout | G06F 3/005 |
| | | | 345/8 |
| 2013/0335301 A1* | 12/2013 | Wong | G02B 27/0093 |
| | | | 345/8 |
| 2014/0071043 A1* | 3/2014 | Jung | G06F 3/03 |
| | | | 345/156 |
| 2014/0078043 A1 | 3/2014 | Kim | |
| 2014/0092010 A1 | 4/2014 | Sako et al. | |
| 2014/0118631 A1* | 5/2014 | Cho | G02B 27/017 |
| | | | 348/836 |
| 2014/0306981 A1 | 10/2014 | Kobayashi | |
| 2015/0016674 A1* | 1/2015 | Cho | G06K 9/00335 |
| | | | 382/103 |
| 2015/0058709 A1* | 2/2015 | Zaletel | H04L 65/608 |
| | | | 715/202 |
| 2015/0062164 A1* | 3/2015 | Kobayashi | G06T 11/60 |
| | | | 345/633 |
| 2015/0084857 A1 | 3/2015 | Kimura | |
| 2015/0317837 A1* | 11/2015 | Sholudko | G06T 19/006 |
| | | | 345/633 |
| 2016/0048211 A1 | 2/2016 | Raffle | |
| 2016/0282938 A1 | 9/2016 | Sako et al. | |
| 2017/0257414 A1* | 9/2017 | Zaletel | H04L 65/608 |
| 2018/0181273 A1* | 6/2018 | Koga | G06F 3/0485 |
| 2019/0075610 A1* | 3/2019 | Ko | H04W 76/14 |

FOREIGN PATENT DOCUMENTS

| | | |
|---|---|---|
| JP | H08-006708 A | 1/1996 |
| JP | H11-261920 A | 9/1999 |
| JP | 2000-029619 A | 1/2000 |
| JP | 2000-284886 A | 10/2000 |
| JP | 2001-203954 A | 7/2001 |
| JP | 2004-320209 A | 11/2004 |
| JP | 2005-172851 A | 6/2005 |
| JP | 2006-31206 A | 2/2006 |
| JP | 2007-166316 A | 6/2007 |
| JP | B2-3968467 | 8/2007 |
| JP | 2009-075763 A | 4/2009 |
| JP | 2009-251154 A | 10/2009 |
| JP | 2010-153960 A | 7/2010 |
| JP | 2010-263324 A | 11/2010 |
| JP | 2011-221821 A | 11/2011 |
| JP | 2012-198668 A | 10/2012 |
| JP | 5037718 B1 | 10/2012 |
| JP | B2-5082722 | 11/2012 |
| JP | 2013-092781 A | 5/2013 |
| JP | 2013-104987 A | 5/2013 |
| JP | 2013-110764 A | 6/2013 |
| JP | 2013-172432 A | 9/2013 |
| JP | 2014-6914 A | 1/2014 |
| WO | WO 2013116163 A1 * | 8/2013 ......... H04N 21/4788 |

OTHER PUBLICATIONS

Jan. 14, 2016 Office Action issued in U.S. Appl. No. 14/454,302.
Jan. 19, 2017 Office Action Issued in U.S. Appl. No. 14/454,302.
Jul. 19, 2017 Office Action issued in U.S. Appl. No. 14/454,302.
Apr. 18, 2018 Office Action issued in U.S. Appl. No. 14/454,302.
Sep. 27, 2018 Office Action issued in U.S. Appl. No. 14/454,302.
Final Office action for U.S. Appl. No. 14/454,302 dated Sep. 27, 2018 (38 pages).

\* cited by examiner

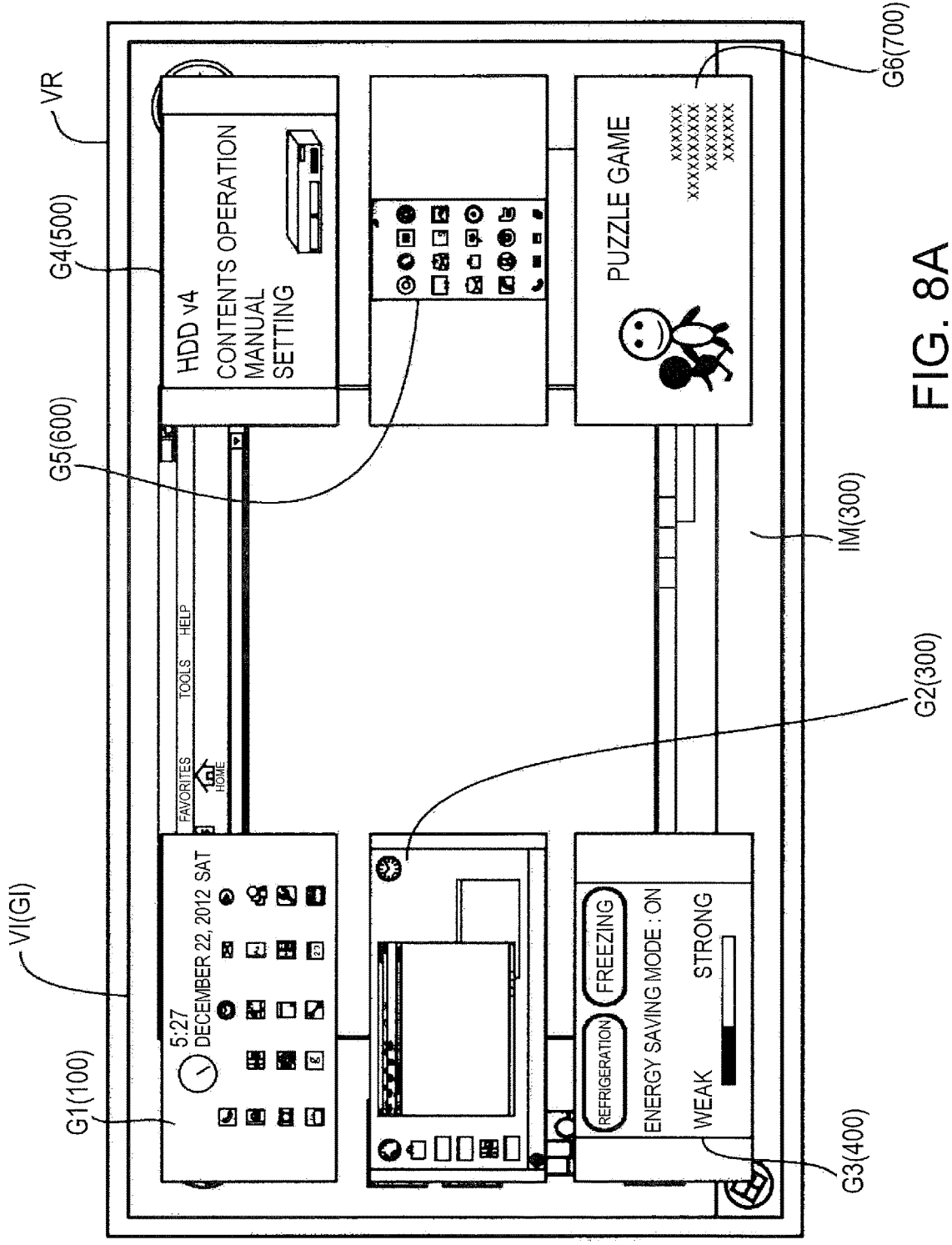

IMAGE DISPLAY DEVICE, METHOD OF CONTROLLING IMAGE DISPLAY DEVICE, COMPUTER PROGRAM, AND IMAGE DISPLAY SYSTEM

BACKGROUND

1. Technical Field

The present invention relates to an image display device.

2. Related Art

A head mounted display (HMD), which is a display device mounted on the head, is known. For example, the head mounted display generates image light, which represents an image, using a liquid crystal display and a light source and guides the generated image light to the eyes of a user using a projection optical system, a light guide plate, and the like to thereby cause the user to visually recognize a virtual image. The head mounted display is connected to an external device such as a smart phone by a wired interface such as a Micro USB (Universal Serial BUS). The head mounted display can receive a video signal from the external device in conformity to a standard such as MHL (Mobile High definition Link). Similarly, the head mounted display is connected to an external device by a wireless interface such as a wireless LAN. The head mounted display can receive a video signal from the external device in conformity with a standard such as Miracast. The head mounted display can cause, on the basis of the video signal received in this way, the user of the head mounted display to visually recognize a virtual image same as an image displayed on a display screen of the external device.

Japanese Patent No. 3968467 (Patent Literature 1) describes an AV (Audio Visual) system that can integrate and display the present program video, information concerning the present program video, and program information of other channels on one screen. Japanese Patent No. 5082722 (Patent Literature 2) describes an image display device in which virtual screens are provided adjacent to display screens of a plurality of computer devices and users of the computer devices can operate windows on the virtual screens.

In the technique described in Patent Literature 1, an analog broadcast receiving unit and a digital broadcast receiving unit are exemplified as AV devices connected to the AV system. That is, the technique described in Patent Literature 1 targets videos transmitted and received between specific devices and has low versatility. The technique described in Patent Literature 2 merely provides display means different from the display screens of the computer devices, that is, the virtual screens and cannot integrate the display screens of the plurality of computer devices.

Therefore, there has been a demand for an image display device that can integrate displays in external devices around the image display device (peripheral devices). Besides, there have been various demands for image display devices such as improvement of versatility, improvement of usability, improvement of convenience, improvement of reliability, and a reduction in manufacturing costs.

SUMMARY

An advantage of some aspects of the invention is to solve at least a part of the problems described above, and the invention can be implemented as the following forms.

(1) An aspect of the invention provides an image display device. The image display device includes: a generating unit configured to generate an integrated image including first display regions where at least a part of a plurality of identification images for distinguishing a plurality of external devices connected to the image display device from one another are displayed as a list and a second display region where a display image, which is an image displayed by one external device selected out of the plurality of external devices, is displayed; and an image display unit configured to cause a user of the image display device to visually recognize the integrated image. With the image display device in this aspect, the image display unit can cause the user to visually recognize the integrated image including at least a part of the plurality of identification images of the plurality of external devices connected to the image display device and the display image, which is the image displayed by the one external device selected out of the plurality of external devices. Therefore, it is possible to provide the image display device that can integrate displays in the external devices around the image display device, in other words, connected to the image display device.

(2) The image display device in the aspect may further include: an acquiring unit configured to acquire the display image from the one external device; and an updating unit configured to update the second display region of the integrated image using the acquired display image. With the image display device in this aspect, the image display unit can cause, concerning the one external device selected out of the plurality of external devices, the user to visually recognize an integrated image in which the display image of the external device is updated.

(3) In the image display device in the aspect, the identification image may include at least any one of a display image at one point in time of the external device, an image representing information for identifying the external device, and an image representing a symbol allocated to the external device. With the image display device in this aspect, the first display regions of the integrated image can include at least one of the display image at one point in time of the external device, the image representing the information for identifying the external device, and the image representing the symbol allocated to the external device.

(4) The image display device in the aspect may further include an external-device specifying unit configured to specify an external device, to which the user directs attention, out of the plurality of external devices. In the image display device, the generating unit may display, in the first display regions, at least the identification image of the external device specified by the external-device specifying unit in the past among the plurality of external devices. With the image display device in this aspect, the generating unit displays, in the first display regions, at least the identification image of the external device, to which the user directed attention in the past, among the plurality of external devices connected to the image display device. In this way, the user can select the external device displayed in the first display region by "directing attention". Therefore, convenience for the user is improved. Further, for example, when a large number of external devices are connected to the image display device, it is possible to suppress complication of the first display regions.

(5) The image display device in the aspect may further include an external-device specifying unit configured to specify an external device, to which the user directs attention, out of the plurality of external devices. In the image display device, the acquiring unit may acquire the display image from the external device specified by the external-device specifying unit. With the image display device in this aspect, the acquiring unit acquires the display image from the external device to which the user directs attention. The updating unit updates the second display region of the integrated image using the acquired display image. In this way, the user can select the external device displayed in the second display region by "directing attention". Therefore, convenience for the user is improved.

(6) The image display device in the aspect may further include a distance acquiring unit configured to acquire distances between the image display device and the plurality of external devices. In the image display device, the generating unit may determine, according to the acquired respective distances, at least one of display order of the plurality of identification images in the first display regions and the size of the identification images in the first display regions. With the image display device in this aspect, the image display unit can cause the user to visually recognize the integrated image in which at least one of the display order and the size of the plurality of display images in the first display regions is changed according to the distances between the image display device and the plurality of external devices. As a result, the user can learn the distances between the image display device and the plurality of external devices according to the display order or the size of the plurality of display images in the first display regions.

(7) In the image display device in the aspect, the generating unit may update the first display regions. With the image display device in this aspect, the generating unit can update the first display regions.

(8) In the image display device in the aspect, the image display unit may further include a display driving unit configured to generate image light representing the integrated image and may emit the generated image light to the eyes of the user to cause the user to visually recognize the integrated image. With the image display device in this aspect, the image display device can be configured as a head mounted display.

(9) In the image display device in the aspect, the generating unit may set an aspect ratio of the second display region as an aspect ratio of a generable region of the image light generated by the display driving unit and generate the integrated image in which the first display regions are arranged on the outer side of the second display region. The image display unit may cause, when there is no operation by the user, the display driving unit to generate the image light of a portion of the integrated image equivalent to the second display region and cause, when there is operation by the user, the display driving unit to generate at least the image light of a portion of the integrated image equivalent to the first display regions. With the image display device in this aspect, the image display unit causes, when there is no operation by the user, the user to visually recognize the portion of the integrated image equivalent to the second display region and causes, when there is operation by the user, the user to visually recognize the portion of the integrated image equivalent to the first display regions. As a result, with the image display device in this aspect, it is possible to provide a virtual screen (the first display regions) on the outer side of a normal screen (the second display region) and switch display of the normal screen and the virtual screen according to the operation by the user. As a result, it is possible to improve convenience for the user.

(10) In the image display device in the aspect, the image display unit may cause the display driving unit to generate image light representing information for additional presentation to be added to the one external device and for providing the user with augmented reality and emit the generated image light to the eyes of the user to cause the user to visually recognize the information for additional presentation. With the image display device in this aspect, when the user directs attention to one external device, the image display unit can cause the user to visually recognize the information for additional presentation for providing the user with augmented reality. As a result, it is possible to improve convenience for the user.

(11) Another aspect of the invention provides an image display system. The image display system includes: an information processing device; an image display device connected to the information processing device; and a plurality of external devices connected to the information processing device. The information processing device includes: a proxy generating unit configured to generate an integrated image including first display regions where at least a part of a plurality of identification images for distinguishing the plurality of external devices from one another are displayed as a list and a second display region where a display image, which is an image displayed by one external device selected out of the plurality of external devices, is displayed; and a transmitting unit configured to transmit the integrated image to the information processing device. The image display device includes an image display unit configured to cause a user of the image display device to visually recognize the integrated image received from the information processing device. With the image display system in this aspect, it is possible to provide the image display system that can integrate displays in the external devices around the image display device, in other words, connected to the image display device via the information processing device.

Not all of a plurality of components in the aspects of the invention are essential. To solve a part or all of the problems or to attain a part or all of effects described in this specification, concerning a part of the plurality of components, it is possible to perform a change, deletion, replacement with new components, and partial deletion of limited contents of the components as appropriate. To solve a part or all of the problems or to attain a part or all of the effects described in this specification, it is also possible to combine a part or all of the technical features included in the one aspect of the invention with the technical features included in the other aspects of the invention to form an independent aspect of the invention.

For example, the aspect of the invention can be implemented as a device including a part or all of the two components, i.e., the generating unit and the image display unit. That is, the device may or may not include the generating unit. The device may or may not include the image display unit. The device can be implemented as, for example, an image display device. The device can also be implemented as devices other than the image display device. A part or all of the technical features of the image display device in the aspects explained above can be applied to the device.

Note that the invention can be implemented in various forms. For example, the invention can be implemented in forms such as an image display device, a control method for the image display device, an image display system including the image display device, a head mounted display, a control method for the head mounted display, an image display system including the head mounted display, a computer program for implementing the methods, the devices, or the systems, and a recording medium having the computer program recorded therein.

BRIEF DESCRIPTION OF THE DRAWINGS

The invention will be described with reference to the accompanying drawings, wherein like numbers reference like elements.

FIG. 8A is an explanatory diagram showing a state in which an integrated image, in which a second display region is updated, is displayed in the head mounted display.

DESCRIPTION OF EXEMPLARY EMBODIMENTS

A. First Embodiment

A-1. Configuration of an Image Display System

Figure 1:
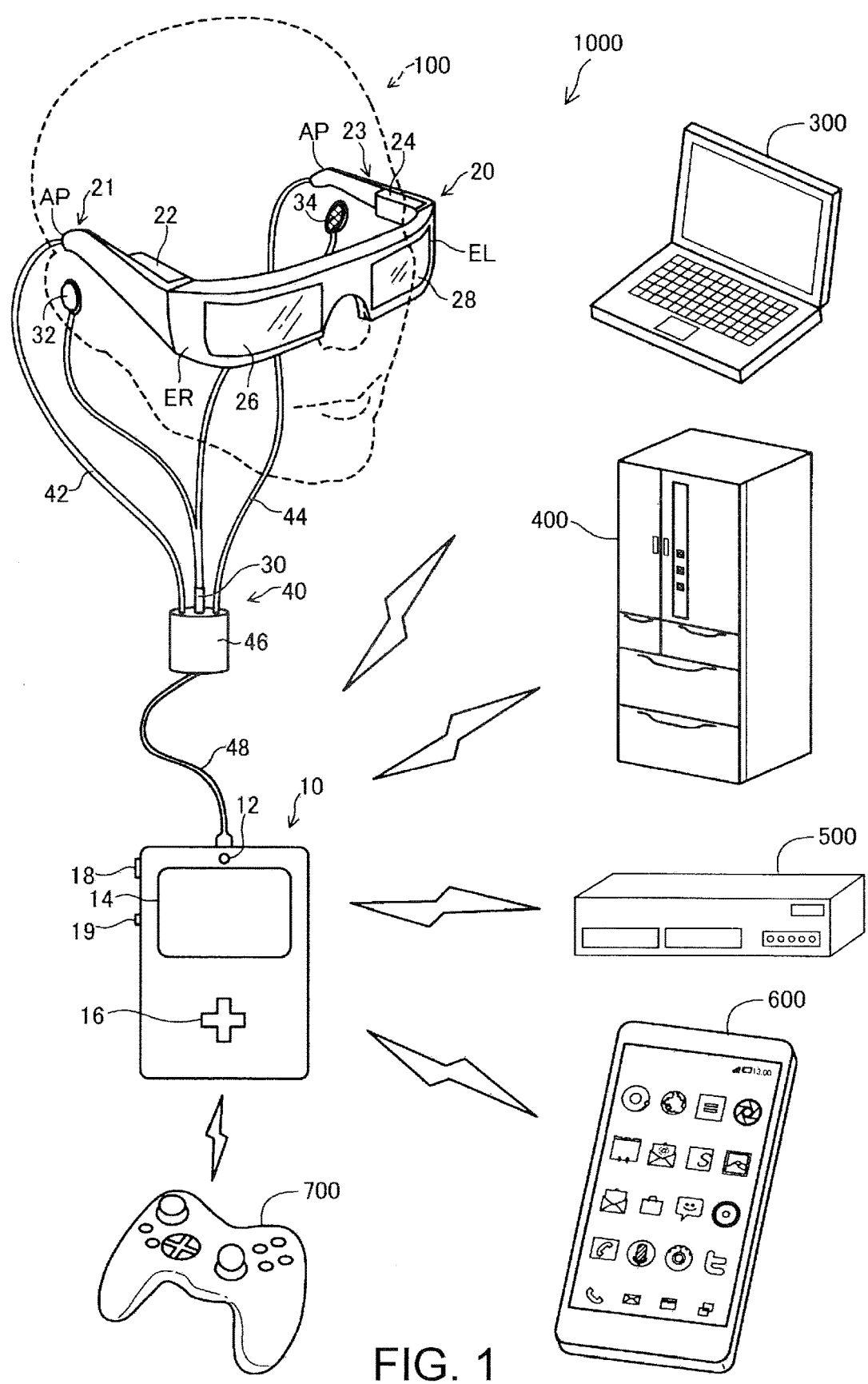
FIG. 1 is an explanatory diagram showing a schematic configuration of an image display system in an embodiment of the invention.

FIG. 1 is an explanatory diagram showing the schematic configuration of an image display system 1000 in an embodiment of the invention. The image display system 1000 includes a head mounted display 100, a computer 300 (PC 300), a home electric appliance 400, an AV (Audio Visual) device 500, a portable terminal 600, and a game device 700. In the following explanation, the head mounted display 100 is referred to as "image display device" as well. Similarly, the PC 300, the home electric appliance 400, the AV device 500, the portable terminal 600, and the game device 700 are collectively referred to as "external devices" as well. The image display system 1000 is a system that causes the head mounted display 100 to display an "integrated image" obtained by integrating displays in the external devices connected to the head mounted display 100.

The head mounted display 100 is an image display device mounted on the head and is called head mounted display (HMD) as well. The head mounted display 100 in this embodiment is an optical see-through head mounted display with which a user can visually recognize a virtual image and directly visually recognize an outside view. The PC 300 is an information communication terminal. In this embodiment, a notebook personal computer is exemplified as the PC 300. However, the PC 300 may be configured by other information communication terminals such as a desktop personal computer. The home electric appliance 400 is an electric product for home use. In this embodiment, a refrigerator is exemplified as the home electric appliance 400. However, the home electric appliance 400 may be configured by other electric products such as an air conditioner, a microwave, a washing machine, a telephone, a facsimile, a printer, and a digital camera.

The AV device 500 is a general term of a video device that, for example, records, reproduces, and converts a video and an audio device that, for example, records, reproduces, and converts sound. In this embodiment, a hard disk player is exemplified as the AV device 500. However, the AV device 500 may be configured by other video devices and audio devices such as a television, a DVD (Digital Versatile Disk) player, a component stereo, and a digital audio player. The portable terminal 600 is a portable information communication terminal. In this embodiment, a smartphone is exemplified as the portable terminal 600. However, the portable terminal 600 may be configured by other portable information communication terminals such as a cellular phone, a PDA (Personal Digital Assistant), and a tablet terminal. The game device 700 is a device for actuating a computer game.

The external devices such as the PC 300, the home electric appliance 400, the AV device 500, the portable terminal 600, and the game device 700 are connected to the head mounted display 100 to be capable of communicating with the head mounted display 100 by radio or by wire.

A-2. Configuration of the Head Mounted Display

Figure 2:
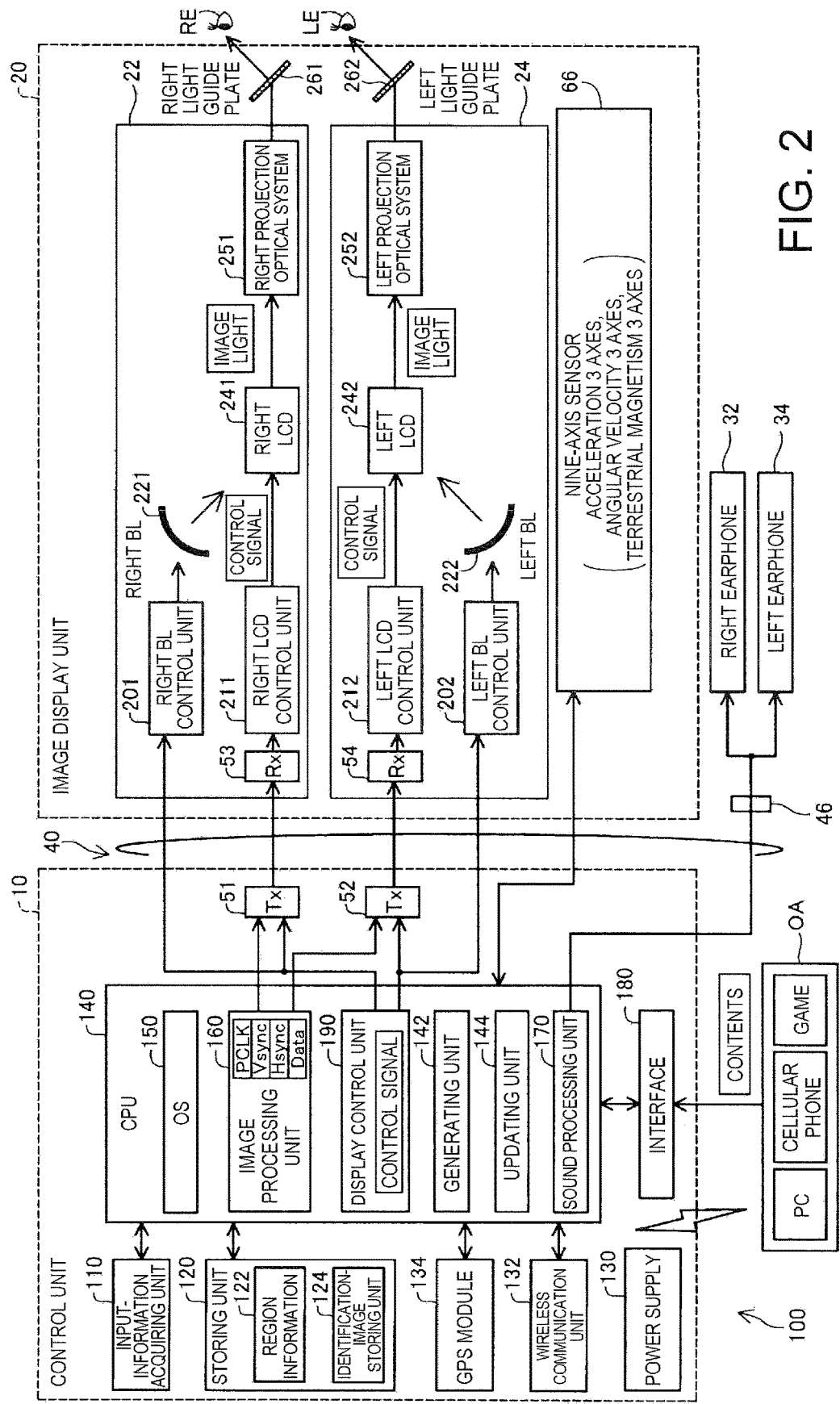
FIG. 2 is a functional block diagram showing the configuration of a head mounted display.

FIG. 2 is a functional block diagram showing the configuration of the head mounted display 100. As shown in FIGS. 1 and 2, the head mounted display 100 includes an image display unit 20 that causes the user to visually recognize a virtual image in a state in which the image display unit 20 is worn on the head of the user and a control unit (a controller) 10 that controls the image display unit 20. The image display unit 20 and the control unit 10 are connected by a connecting unit 40 and perform transmission of various signals via the connecting unit 40. As the connecting unit 40, a metal cable or an optical fiber can be adopted.

A-2-1. Configuration of the Control Unit

The control unit 10 is a device for controlling the head mounted display 100. The control unit 10 includes an input-information acquiring unit 110, a storing unit 120, a power supply 130, a wireless communication unit 132, a GPS module 134, a CPU 140, an interface 180, and transmitting units (Tx) 51 and 52. The units are connected to one another by a not-shown bus (FIG. 2).

The input-information acquiring unit 110 acquires signals corresponding to operation inputs to input devices such as a touch pad, a cross key, a foot switch, gesture detection, visual line detection, touch detection, and a microphone. Specifically, the foot switch is a switch operated by a foot of the user. In the gesture detection, a gesture of the user is detected using a camera or the like. In this case, gestures and commands are associated in advance. Note that, in the gesture detection, a fingertip of the user, a ring worn on a hand of the user, a tool held by the user, and the like may be used as a mark for motion detection. In the visual line detection, a visual line of the user is detected using an infrared sensor or the like. In this case, motions of visual lines and commands are associated in advance. In the touch detection, touch operation by the user on contact sensors provided in arbitrary places (e.g., outer sides of a right holding unit 21 and a left holding unit 23 (FIG. 1)) of a housing of the head mounted display 100 is detected.

In this way, the input-information acquiring unit 110 acquires signals corresponding to operation inputs to the various input devices. In particular, if the input-information acquiring unit 110 acquires operation inputs by the foot switch, the visual line detection, and the microphone, even in a scene in which it is difficult for the user to operate an input device using a hand (e.g., a work scent such as housework, a work scene in a medical site, and a work scene in which manual work is necessary such as a construction industry or a manufacturing industry), it is possible to greatly improve convenience for the user when the head mounted display 100 is used.

Figure 5:
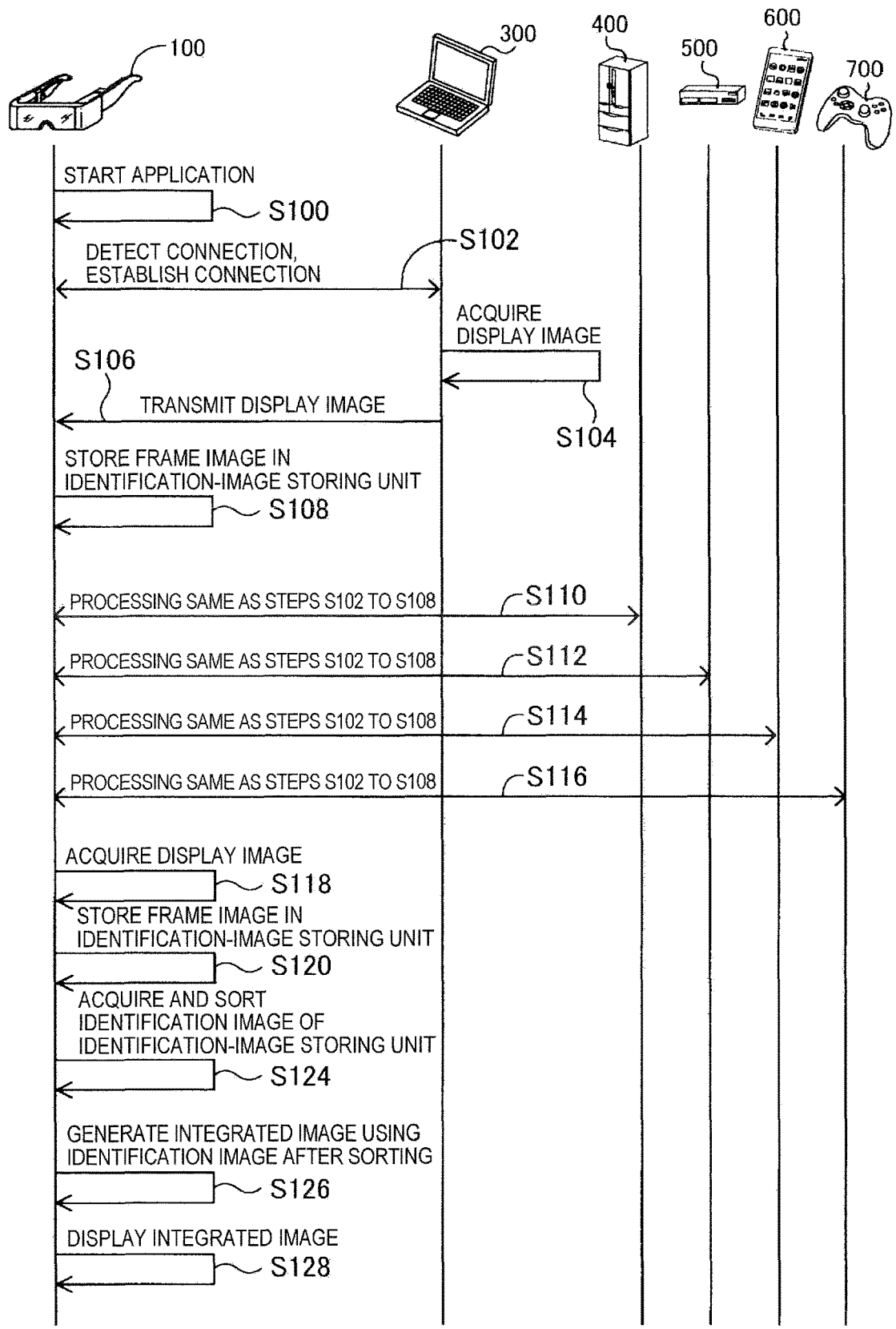
FIG. 5 is a sequence chart showing the order of integrated image display processing.

The storing unit 120 is configured by a ROM, a RAM, a DRAM, a hard disk, and the like. The storing unit 120 includes region information 122 and an identification-image storing unit 124. The region information 122 is information for regulating a "region" included in an integrated image generated in integrated image display processing (FIG. 5). The identification-information storing unit 124 is a storing unit for storing identification images of the external devices collected in the integrated image display processing. The integrated image display processing is processing for generating an integrated image and causing the head mounted display 100 to display the integrated image. The integrated image is an image including identification images of a plurality of external devices connected to the head mounted display 100 and a display image, which is an image displayed by one external device selected by the user out of the plurality of external devices (hereinafter simply referred to as "display image" as well). Integrated image update processing is processing for dynamically updating the display image of the one external device selected by the user in the integrated image and causing the head mounted display 100 to display the display image.

Figure 3:
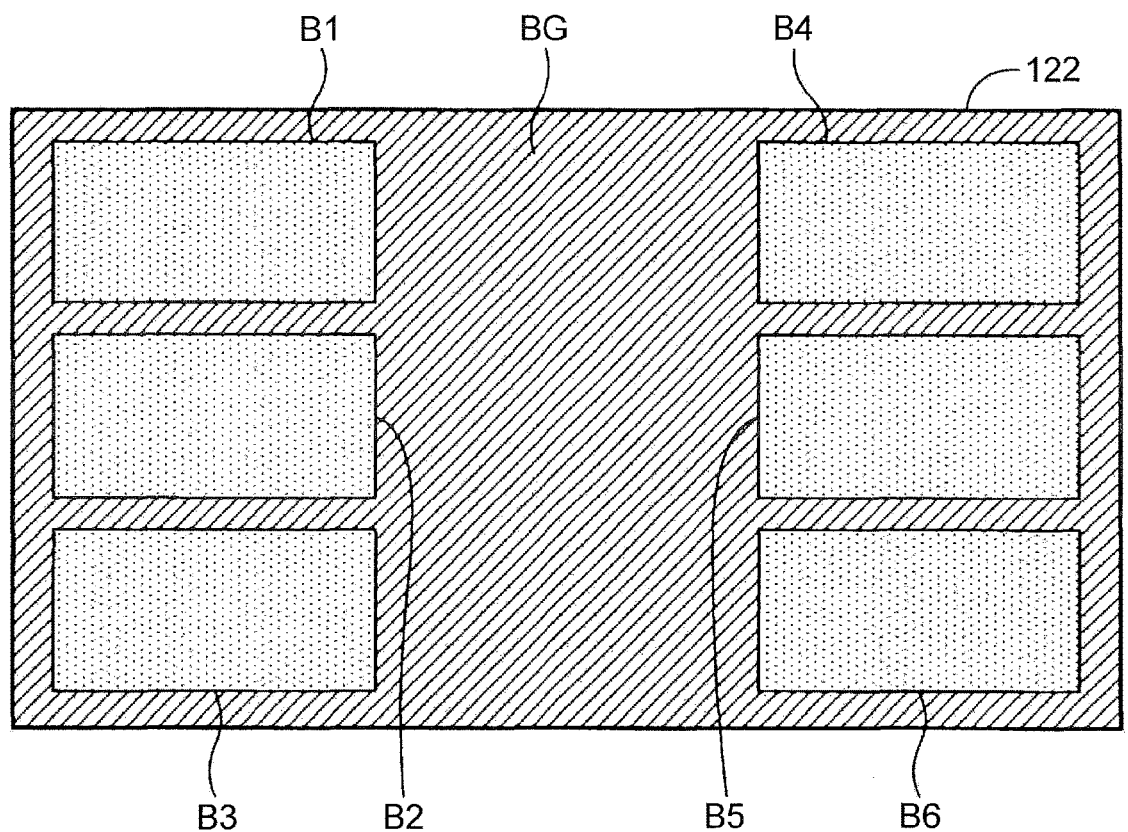
FIG. 3 is an explanatory diagram showing an example of region information.

"The identification images of the external devices" are images for distinguishing the external devices connected to the head mounted display 100 from one another. As the identification images of the external devices in this embodiment, for example, images representing information exemplified as a1 to a3 below can be used.
(a1) Display images at a point in time of the external devices
(a2) Display images on an operation screen and a setting screen of the external devices
(a3) A reduced moving image of display images in one period of the external devices FIG. 3 is an explanatory diagram showing an example of the region information 122. The region information 122 includes a rectangular region (hereinafter referred to as "region 122" as well. The region 122 preferably has an aspect ratio same as an aspect ratio of display devices (a right LCD 241 and a left LCD 242 in FIG. 2) of the head mounted display 100. The region 122 includes six thumbnail display regions B1 to B6 and an active display region BG. The thumbnail display regions B1 to B6 are regions for displaying identification images of a plurality of external devices as a list when the identification images of the plurality of external devices are arranged in the regions in integrated image display processing (FIG. 5). The thumbnail display regions B1 to B6 are referred to as "first display regions" as well. The active display region BG is a region for arranging a display image of one external device selected out of the plurality of external devices by the user. The active display region BG is referred to as "second display region" as well.

In the example shown in FIG. 3, the thumbnail display regions B1 to B3 are arranged at the left end of the region 122 to be adjacent to one another in the vertical direction. The thumbnail display regions B4 to B6 are arranged at the right end of the region 122 to be adjacent to one another in the vertical direction. The thumbnail display regions B1 to B6 are regions having the same size. In the example shown in FIG. 3, the active display region BG is a region occupying a portion excluding the thumbnail display regions B1 to B6 in the region 122. In FIG. 3, the thumbnail display regions B1 to B6 are hatched by dots. The active display region BG is hatched by diagonal lines.

Note that the arrangement and the size of the thumbnail display regions B1 to B6 shown in FIG. 3 are examples and can be arbitrarily set. For example, the thumbnail display regions B1 to B6 may be arranged at the upper end or the lower end of the region 122. The thumbnail display regions B1 to B6 may be arranged to surround the four sides of the region 122. The thumbnail display regions B1 to B6 may have sizes different from one another. Further, the thumbnail display regions B1 to B6 may partially overlap one another. However, to improve visibility of the active display region BG, the thumbnail display regions B1 to B6 are preferably arranged at an end of the region 122 where a visual line of the user is not hindered.

The power supply 130 supplies electric power to the units of the head mounted display 100. As the power supply 130, for example, a secondary battery can be used. The wireless communication unit 132 performs wireless communication with the external devices according to a predetermined wireless communication standard (e.g., infrared ray, short range wireless communication exemplified by Bluetooth (registered trademark), or a wireless LAN exemplified by IEEE802.11). The GPS module 134 receives a signal from a GPS satellite to thereby detect the present position of the user of the head mounted display 100 and generates present position information representing the present position of the user. Note that the present position information can be implemented by, for example, coordinates representing latitude and longitude.

The CPU 140 reads out and executes a computer program stored in the storing unit 120 to thereby function as a generating unit 142, an updating unit 144, an operating system (OS) 150, an image processing unit 160, a sound processing unit 170, and a display control unit 190.

The generating unit 142 executes the integrated image display processing (FIG. 5) and generates an integrated image. The generating unit 142 implements a function of a "generating unit" that generates, concerning a plurality of external devices, an integrated image including first display regions where a plurality of identification images for distinguishing the plurality of external devices from one another are displayed as a list and a second display region where a display image of one external device selected out of the plurality of external devices by the user is displayed. The updating unit 144 executes the integrated image update processing (FIG. 7) and updates the integrated image. The updating unit 144 implements a function of an "acquiring unit" that acquires the display image of the one external device selected out of the plurality of external devices by the user and a function of an "updating unit" that updates the second display region of the integrated image using the acquired display image.

The image processing unit 160 generates a signal on the basis of a video signal input from the generating unit 142, the interface 180, the wireless communication unit 132, or the like via the OS 150. The image processing unit 160 supplies the generated signal to the image display unit 20 via the connecting unit 40 to control display in the image display unit 20. The signal to be supplied to the image display unit 20 is different in an analog format and in a digital format.

For example, in the case of the digital format, a video signal in a synchronized state of a digital R signal, a digital G signal, a digital B signal, and a clock signal PCLK are synchronized is input. The image processing unit 160 executes, according to necessity, well-known image processing such as resolution conversion processing, various tone correction processing such as adjustment of luminance and chroma, or keystone correction processing on image data Data formed by the digital R signal, the digital G signal, and the digital B signal. Thereafter, the image processing unit 160 transmits the clock signal PCLK and the image data Data via the transmitting units 51 and 52.

In the case of the analog format, a video signal formed by an analog R signal, an analog G signal, an analog B signal, a vertical synchronization signal VSync, and a horizontal synchronization signal HSync is input. The image processing unit 160 separates the vertical synchronization signal VSync and the horizontal synchronization signal HSync from the input signal and generates, according to cycles of the synchronization signals, the clock signal PCLK using a not-shown PLL circuit or the like. The image processing unit 160 converts the analog R signal, the analog G signal, and the analog B signal into digital signals using an A/D conversion circuit. After executing, according to necessity, the well-known image processing on the image data Data formed by the digital R signal, the digital G signal, and the digital B signal after the conversion, the image processing unit 160 transmits the clock signal PCLK, the image data Data, the vertical synchronization signal VSync, and the horizontal synchronization signal HSync via the transmitting units 51 and 52. Note that, in the following explanation, the image data Data transmitted via the transmitting unit 51 is referred to as "image data for right eye Data1" as well and the image data Data transmitted via the transmitting unit 52 is referred to as "image data for left eye Data2" as well.

The display control unit 190 generates control signals for controlling a right display driving unit 22 and a left display driving unit 24 included in the image display unit 20. The control signals are signals for individually switching driving ON/OFF of a right LCD 241 by a right LCD control unit 211, driving ON/OFF of a right backlight 221 by a right backlight control unit 201, driving ON/OFF of a left LCD 242 by a left LCD control unit 212, and driving ON/OFF of a left backlight 222 by a left backlight control unit 202. The display control unit 190 controls, according to the control signals, generation and emission of image light in the right display driving unit 22 and the left display driving unit 24.

The display control unit 190 transmits the generated control signals via the transmitting units 51 and 52.

The sound processing unit 170 acquires sound signal included in contents, amplifies the acquired sound signal, and supplies the sound signal to a not-shown speaker of a right earphone 32 and a not-shown speaker of a left earphone 34.

The interface 180 performs wireless communication with the external devices according to a predetermined wired communication standard (e.g., Micro USB (Universal Serial Bus), USB, HDMI (High Definition Multimedia Interface), DVI (Digital Visual Interface), VGA (Video Graphics Array), composite, RS-232C (Recommended Standard 232), or wired LAN exemplified by IEEE802.3).

A-2-2. Configuration of the Image Display Unit

The image display unit 20 is a wearing body worn on the head of the user. In this embodiment, the image display unit 20 has an eyeglass shape. The image display unit 20 includes the right display driving unit 22, the left display driving unit 24, a right optical-image display unit 26 (FIG. 1), a left optical-image display unit 28 (FIG. 1), and a nine-axis sensor 66.

The right display driving unit 22 and the left display driving unit 24 are arranged in positions opposed to the temples of the user when the user wears the image display unit 20. The right display driving unit 22 and the left display driving unit 24 in this embodiment generate image light representing an image and emit the image light using a liquid crystal display (hereinafter referred to as "LCD") and a projection optical system. The right display driving unit 22 includes a receiving unit (Rx) 53, the right backlight (BL) control unit 201 and the right backlight (BL) 221 functioning as a light source, the right LCD control unit 211 and the right LCD 241 functioning as a display device, and a right projection optical system 251.

The receiving unit 53 receives data transmitted from the transmitting unit 51. The right backlight control unit 201 drives the right backlight 221 on the basis of an input control signal. The right backlight 221 is a light emitting body such as an LED or an electroluminescence (EL) device. The right LCD control unit 211 drives the right LCD 241 on the basis of the input clock signal PCLK, the image data for right eye Data1, the vertical synchronization signal VSync, and the horizontal synchronization signal HSync. The right LCD 241 is a transmission liquid crystal panel on which a plurality of pixels are arranged in a matrix shape. The right LCD 241 changes, by driving liquid crystal in positions of the pixels arranged in a matrix shape, the transmittance of light transmitted through the right LCD 241 to thereby modulate illumination light irradiated from the right backlight 221 into effective image light representing an image. The right projection optical system 251 is configured by a collimate lens that changes the image light emitted from the right LCD 241 to light beams in a parallel state.

The left display driving unit 24 includes a configuration substantially the same as the configuration of the right display driving unit 22 and operates in the same manner as the right display driving unit 22. That is, the left display driving unit 24 includes a receiving unit (Rx) 54, the left backlight (BL) control unit 202 and the left backlight (BL) 222 functioning as a light source, the left LCD control unit 212 and the left LCD 242 functioning as a display device, and a left projection optical system 252. Detailed explanation is omitted. Note that, in this embodiment, a backlight system is adopted. However, the image light may be emitted using a front light system or a reflection system.

The right optical-image display unit 26 and the left optical-image display unit 28 are arranged to be respectively located in front of the left and right eyes of the user when the user wears the image display unit 20 (see FIG. 1). The right optical-image display unit 26 includes a right light guide plate 261 and a not-shown dimming plate. The right guide plate 261 is formed of light-transmissive resin material or the like. The light guide plate 261 guides image light output from the right display driving unit 22 to a right eye RE of the user while reflecting the image light along a predetermined optical path. As the right light guide plate 261, a diffraction grating may be used or a transreflective film may be used. The dimming plate is a thin plate-like optical device and is arranged to cover the front side of the image display unit 20. The dimming plate protects the right light guide plate 261 and suppresses, for example, damage and adhesion of stain to the right light guide plate 261. By adjusting the light transmittance of the dimming plate, it is possible to adjust an amount of external light made incident on the eyes of the user and adjust easiness of visual recognition of a virtual image. Note that the dimming plate can be omitted.

The left optical-image display unit 28 includes a configuration substantially the same as the configuration of the right optical-image display unit 26 and operates in the same manner as the right optical-image display unit 26. That is, the left optical-image display unit 28 includes a left light guide plate 262 and a not-shown dimming plate and guides image light output from the left display driving unit 24 to a left eye LE of the user. Detailed explanation is omitted.

The nine-axis sensor 66 is a motion sensor that detects acceleration (three axes), angular velocity (three axes), and terrestrial magnetism (three axes). Since the nine-axis sensor 66 is provided in the image display unit 20, when the image display unit 20 is worn on the head of the user, the nine-axis sensor 66 functions as a motion detecting unit that detects the motion of the head of the user of the head mounted display 100. The motion of the head includes the speed, the acceleration, the angular velocity, the direction, and a change in the direction of the head.

Figure 4:
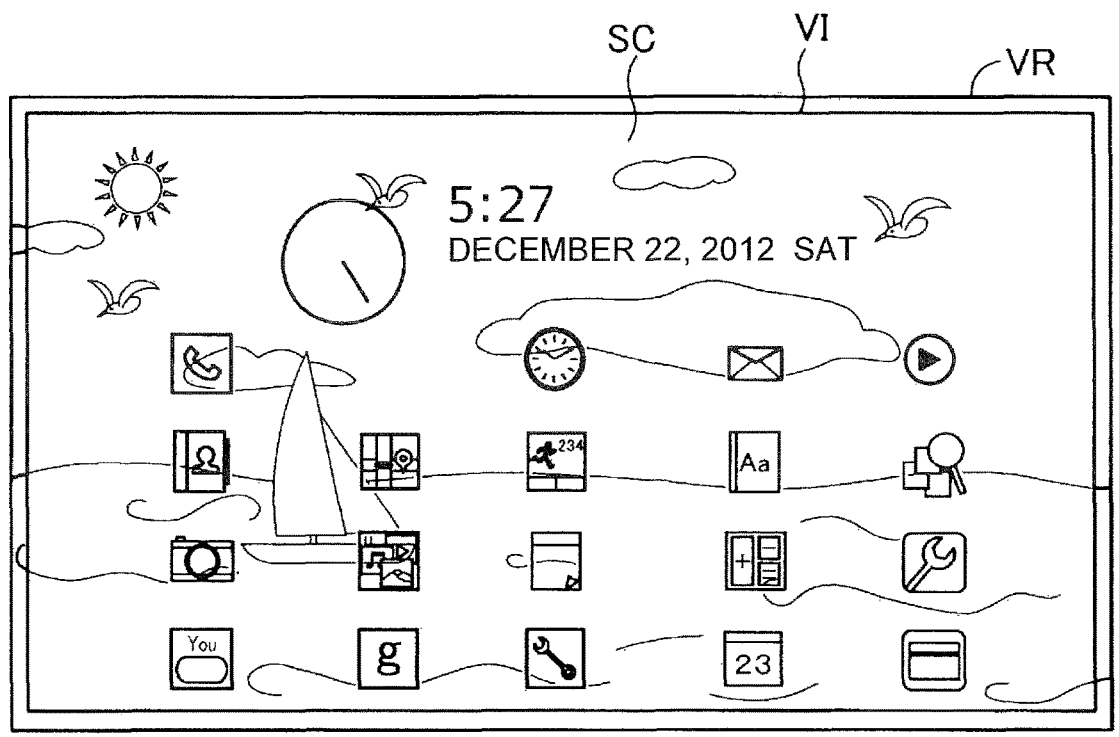
FIG. 4 is an explanatory diagram showing an example of a virtual image visually recognized by a user.

FIG. 4 is an explanatory diagram showing an example of a virtual image visually recognized by the user. In FIG. 4, a visual field VR of the user is illustrated. The image light guided to both the eyes of the user of the head mounted display 100 as explained above is imaged on the retinas of the user. Consequently, the user can visually recognize a virtual image VI. In the example shown in FIG. 4, the virtual image VI is a standby screen of the OS of the head mounted display 100. The user visually recognizes an outside scene SC through the right optical-image display unit 26 and the left-optical image display unit 28. In this way, in a portion where the virtual image VI is displayed in the visual field VR, the user of the head mounted display 100 in this embodiment can view the virtual image VI and the outside scene SC behind the virtual image VI. In a portion where the virtual image VI is not displayed in the visual field VR, the user can directly view the outside scene SC through the right optical-image display unit 26 and the left optical-image display unit 28. Note that, in this specification, "the head mounted display 100 displays an image" includes causing the user of the head mounted display 100 to visually recognize a virtual image.

A-3. Integrated Image Display Processing

FIG. 5 is a sequence chart showing a procedure of the integrated image display processing. The integrated image display processing in this embodiment is processing for generating an integrated image and causing the head mounted display 100 to display the integrated image. The integrated image is an image including both of identification image of a plurality of external devices connected to the head mounted display 100 and a display image of one external device selected out of the plurality of external devices by the user. The integrated image display processing is mainly executed by the generating unit 142.

In step S100, an application for executing the integrated image display processing is started. The start of the application in step S100 may be triggered by detection by the input-information acquiring unit 110 of start operation by the user or may be triggered by detection of a start command from another application. According to the start of the application in step S100, the CPU 140 implements the functions of the generating unit 142 and the updating unit 144.

In step S102, the wireless communication unit 132 or the interface 180 detects that the PC 300 is connected as an external device. Note that, in an example explained below, the head mounted display 100 and the PC 300 communicate using a wireless LAN conforming to the IEEE802.11. Thereafter, the generating unit 142 establishes connection between the head mounted display 100 and the PC 300.

In step S104, the PC 300 acquires an image of a display screen of the PC 300. Specifically, the PC 300 acquires any one of frame images described in b1 to b3 below. Note that b1 corresponds to a1, b2 corresponds to a2, and b3 corresponds to a3.

(b1) A frame image obtained by rendering a screen displayed in the PC 300 at one point in time such as contents being reproduced in the PC 300 or an application GUI (Graphical User Interface)

(b2) A frame image obtained by rendering an operation screen (i.e., a standby screen) or a setting screen (i.e., a setting screen of an OS or a BIOS) of the PC 300

(b3) A plurality of frame images obtained by rendering a screen displayed in the PC 300 during one period such as contents being reproduced in the PC 300 or an application GUI In step S106, the PC 300 transmits the acquired frame image to the head mounted display 100. The generating unit 142 of the head mounted display 100 acquires the frame image via the wireless communication unit 132. In this case, the generating unit 142 and the wireless communication unit 132 function as the "acquiring unit".

In step S108, the generating unit 142 causes the identification-image storing unit 124 to store the acquired frame image as "an identification image of an external device". Note that the generating unit 142 may cause, after reducing the frame image, the identification-image storing unit 124 to store the frame image. Then, a storage capacity consumed by the identification-image storing unit 124 can be reduced. In step S108, the generating unit 142 may cut the connection between the head mounted display 100 and the PC 300.

In step S110, the generating unit 142 carries out processing same as steps S102 to S108 between the head mounted display 100 and the home electric appliance 400. Similarly, the generating unit 142 carries out the same processing between the head mounted display 100 and the AV device 500 in step S112, between the head mounted display 100 and the portable terminal 600 in step S114, and between the head mounted display 100 and the game device 700 in step S116. As a result of steps S110 to S116, identification images of all the external devices connected to the head mounted display 100 are stored in the identification-image storing unit 124.

In step S118, the generating unit 142 acquires an image of a display screen of the head mounted display 100. Specifically, the generating unit 142 acquires any one of the frame images of b1 to b3 concerning the head mounted display 100.

In step S120, the generating unit 142 causes the identification-image storing unit 124 to store the acquired frame image as "an identification image of an image display device". Note that the generating unit 142 may cause, after reducing the frame image, the identification-image storing unit 124 to store the frame image. As a result of steps S118 and S120, an identification image of the head mounted display 100 itself is stored in the identification-image storing unit 124.

In step S124, the generating unit 142 acquires a plurality of identification images stored in the identification-image storing unit 124 and sorts the acquired identification images according to a predetermined condition. As the condition for the sorting, for example, IDs (e.g., product numbers or serial numbers) of the external devices from which the identification images are acquired, names (e.g., names of products) of the external devices from which the identification images are acquired, acquisition order of the identification images in the identification-image storing unit 124, distances between the external devices from which the identification images are acquired and the head mounted display 100, and types (e.g., PC, home electric appliance, and AV device) of the external devices can be used. Note that the OS 150 can calculate the distances between the external devices and the head mounted display 100 by comparing present position information of the head mounted display 100 detected by the GPS module 134 and present position information of the external devices acquired from the external devices. In this case, the OS 150 functions as a "distance acquiring unit". Note that "the distances between the external devices and the head mounted display 100" include rough distances.

In step S126, the generating unit 142 generates an integrated image using the identification images after the sorting. Specifically, the generating unit 142 arranges the plurality of identification images sorted in step S124 respectively in the thumbnail display regions B1 to B6 (the first display regions) of the region information 122. The generating unit 142 arranges a black image in the active display region BG (the second display region) of the region information 122. A display image of one external device selected by the user is inserted into the active display region BG in integrated image changing processing explained below.

Note that, in step S126, the generating unit 142 may apply a change in the shapes of the identification images, a change in the transmittances of the identification images, cover conversion processing to the identification images, a change in the size of the identification images, decoration (character, figure, sign, etc.) of the identification images, and the like to the identification images. For example, in changing the size of the identification images, the generating unit 142 may determine the size of the identification images according to the distances between the external devices and the head mounted display 100. For example, if the size is set larger for the identification image of the external device closer to the head mounted display 100, it is possible to cause the user, who views the integrated image, to visually grasp the distances between the head mounted display 100 and the external devices. Similarly, the shapes, the transmittances, processing contents of the color conversion processing, and contents of the decoration may be determined according to the distances between the head mounted display 100 and the external devices.

Figure 6:
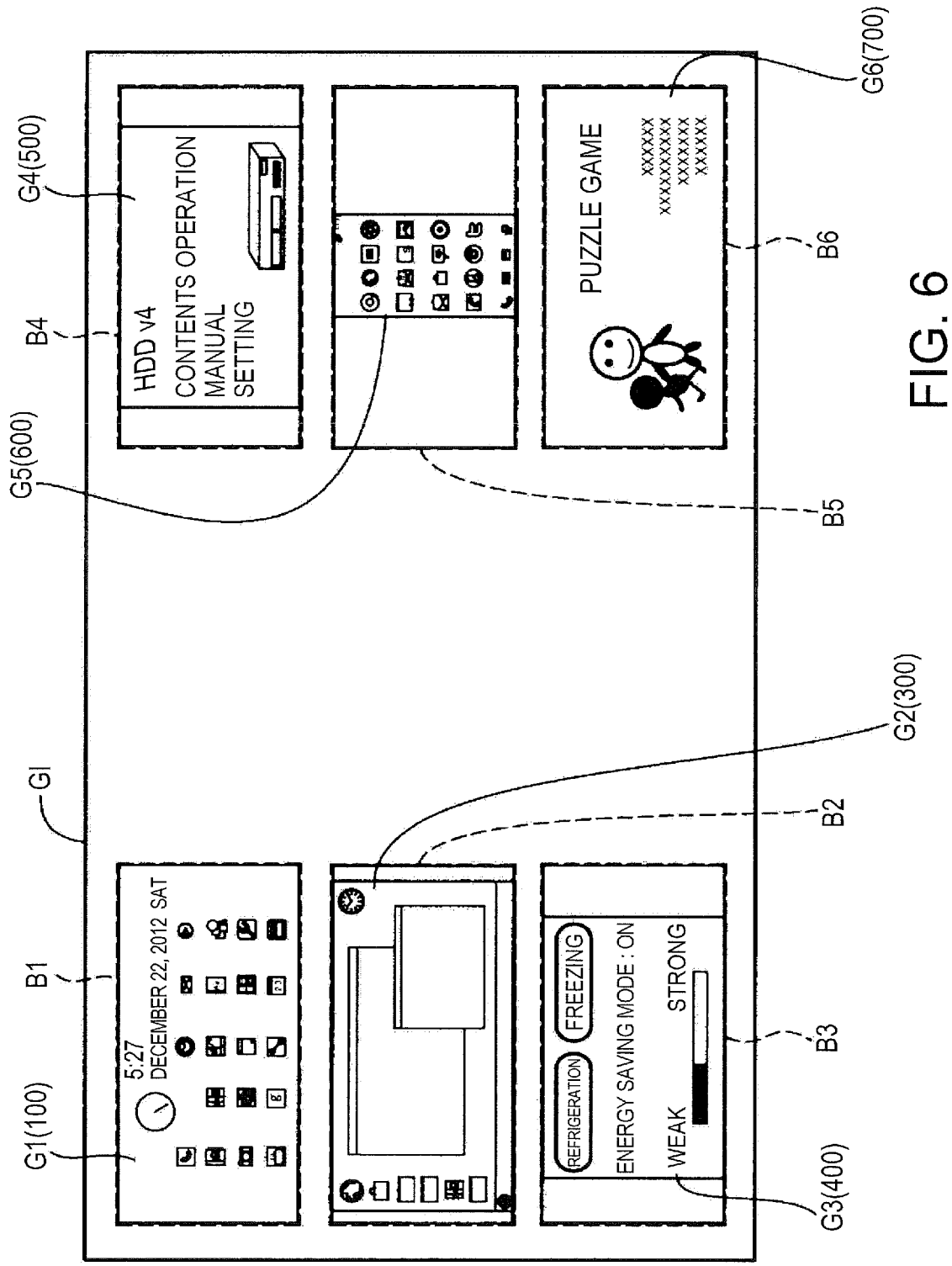
FIG. 6 is an explanatory diagram showing an example of an integrated image generated in step S126.

FIG. 6 is an explanatory diagram showing an example of the integrated image generated in step S126. In the thumbnail display region B1 of an integrated image GI, a display image G1 at one point in time of the head mounted display 100 is arranged as an identification image of the head mounted display 100. Similarly, in the thumbnail display region B2, a display image G2 at one point in time of the PC 300 is arranged as an identification image of the PC 300. In the thumbnail display region B3, a display image G3 of a setting screen of the home electric appliance 400 is arranged as an identification image of the home electric appliance 400. In the thumbnail display region B4, a display image G4 of an operation screen of the AV device 500 is arranged as an identification image of the AV device 500. In the thumbnail display region B5, a display image G5 at one point in time of the portable terminal 600 is arranged as an identification image of the portable terminal 600. In the thumbnail display region B6, a display image G6 at one point in time of the game device 700 is arranged as an identification image of the game device 700. Note that, in the example shown in FIG. 6, an aspect ratio of the thumbnail display regions B1 to B6 and aspect ratios of the identification images G1 to G6 of the external devices do not coincide with each other. In step S126 in FIG. 5, the generating unit 142 may carry out processing for matching the aspect ratios of the identification images G1 to G6 of the external devices respectively with the aspect ratio of the thumbnail display regions B1 to B6.

At step S128 in FIG. 5, the generating unit 142 causes the head mounted display 100 to display the integrated image. Specifically, the generating unit 142 transmits the integrated image generated in step S126 to the image processing unit 160. The image processing unit 160 receives the integrated image and performs the display processing explained above. As a result, image light guided to both the eyes of the user of the head mounted display 100 is imaged on the retinas of the user, whereby the user of the head mounted display 100 can visually recognize a virtual image of the integrated image in the visual field of the user. In other words, the head mounted display 100 can display the integrated image.

A-4. Integrated Image Update Processing

Figure 7:
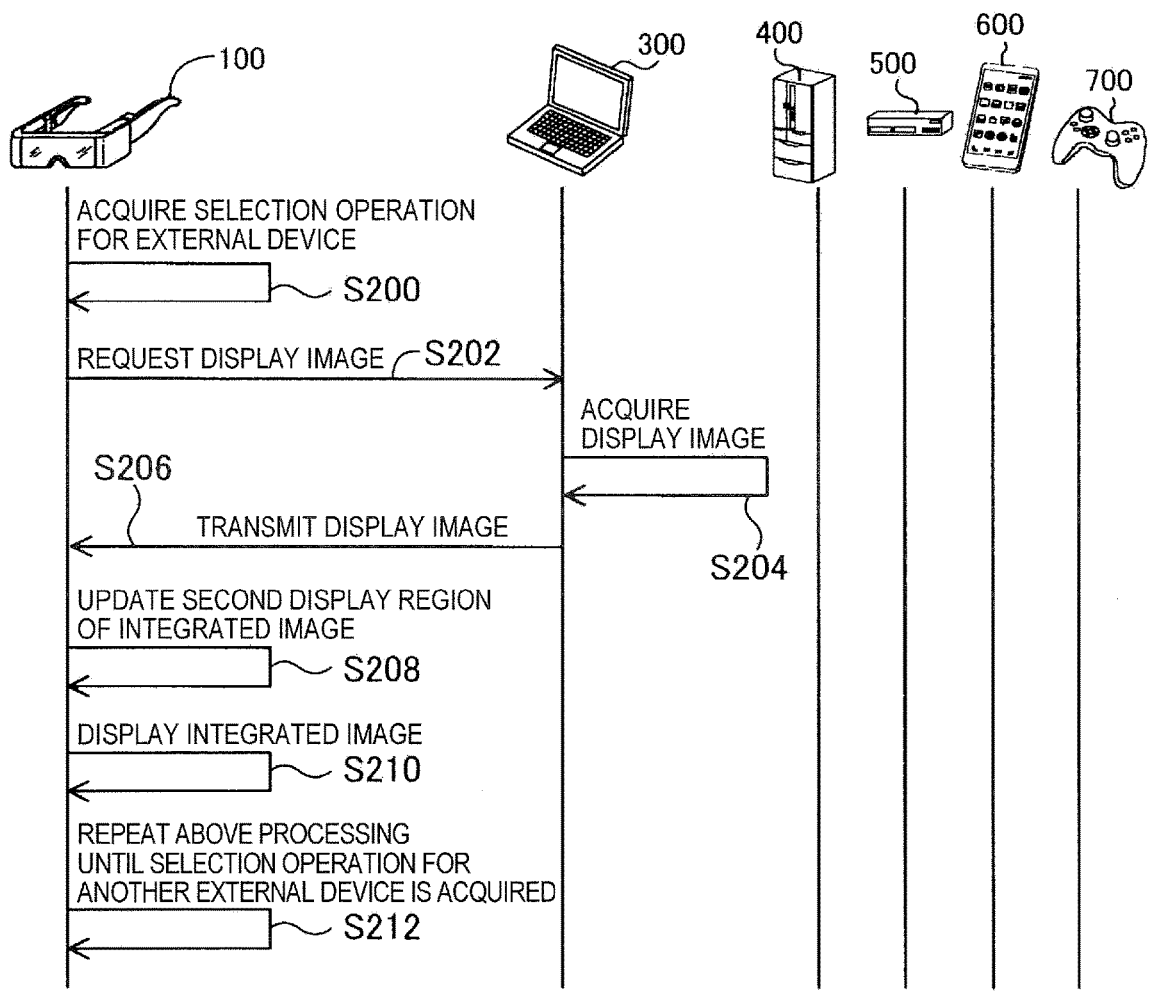
FIG. 7 is a sequence chart showing the order of integrated image update processing.

FIG. 7 is a sequence chart showing a procedure of the integrated image update processing. The integrated image update processing in this embodiment is processing for dynamically updating a display image of one external device selected by the user in the integrated image and causing the head mounted display 100 to display the display image. The integrated image update processing is mainly executed by the updating unit 144.

In step S200, the updating unit 144 acquires selection operation for selecting one external device out of a plurality of external devices via the input-information acquiring unit 110. The selection operation is operation performed by the user of the head mounted display 100. The user can carryout the selection operation using an input device (e.g., a touch pad, a cross key, a foot switch, gesture detection, visual line detection, touch detection, or a microphone) included in the head mounted display 100.

In step S202, the updating unit 144 transmits a request for a display image to the one external device selected by the user. In an example shown in the figure, the external device selected by the user is the PC 300.

In step S204, the external device (the PC 300) receives the request for a display image and acquires a frame image obtained by rendering an image of a display screen of the PC 300, that is, a screen currently displayed in the PC 300 such as contents being reproduced in the PC 300, an application GUI, or the like.

In step S206, the PC 300 transmits the acquired frame image to the head mounted display 100. The updating unit 144 of the head mounted display 100 acquires a first image via the wireless communication unit 132. In this case, the updating unit 144 and the wireless communication unit 132 function as the "acquiring unit".

In step S208, the updating unit 144 updates, using the acquired frame image, the active display region BG (the second display region) in the integrated image generated in step S126 of the integrated image display processing (FIG. 5).

In step S210, the updating unit 144 causes the head mounted display 100 to display an integrated image after the update. Details are the same as step S128 of the integrated image display processing (FIG. 5).

In step S212, the updating unit 144 repeats the processing in steps S202 to S210 for the selected external device (the PC 300) until the updating unit 144 acquires selection operation for another external device different from the selection operation for the external device acquired in step S200. On the other hand, when the updating unit 144 acquires the selection operation for another external device, the updating unit 144 executes the processing in steps S202 to S212 on the other external device.

FIG. 8A is an explanatory diagram showing a state in which an integrated image, in which a second display region is updated, is displayed in the head mounted display 100. As shown in FIG. 8A, in the visual field VR, the user of the head mounted display 100 can visually recognize, as the virtual image VI, the integrated image GI including a plurality of identification images of a plurality of external devices connected to the head mounted display 100 and a display image of one external device selected out of the plurality of external devices. In an example shown in FIG. 8A, the plurality of identification images of the plurality of external devices are the identification image G1 of the head mounted display 100, the identification image G2 of the PC 300, the identification image G3 of the home electric appliance 400, the identification image G4 of the AV device 500, the identification image G5 of the portable terminal 600, and the identification image G6 of the game device 700 explained with reference to FIG. 6. In the example shown in FIG. 8A, the display image of the selected one external device is a display image IN, which is an image displayed by the PC 300. Note that the head mounted display 100 in this embodiment is a transmission-type head mounted display. Therefore, as explained with reference to FIG. 4, the user can visually recognize a background through the visual image VI. The background is not shown in FIG. 8A for convenience of illustration.

As explained above, with the integrated image display processing (FIG. 5) and the integrated image update processing (FIG. 7) in the first embodiment, the image display unit 20 can cause the user to visually recognize the integrated image GI including the plurality of identification images G2 to G7 of the plurality of external devices (the PC 300 to the game device 700) connected to the head mounted display 100 (the image display device) and the display image IN of the one external device (in the example, the PC 300) selected out of the plurality of external devices. Therefore, it is possible to provide the head mounted display 100 that can integrate displays in the external devices around the head mounted display 100, in other words, connected to the head mounted display 100. Note that, in the integrated image display processing (FIG. 5), at least a part of the plurality of identification images G2 to G7 of the plurality of external devices connected to the head mounted display 100 may be included in the thumbnail display regions B1 to B6 (the first display regions). In this way, it is possible provide the head mounted display 100 that can integrate displays in at least a part of the external devices connected to the head mounted display 100.

With the integrated image update processing (FIG. 7) in the first embodiment, the image display unit 20 can cause the user to visually recognize the integrated image GI in which the display screens of the one external device (in the example, the PC 300) selected out of the plurality of external devices (the PC 300 to the game device 700) are dynamically updated. With the integrated image update processing and the integrated image display processing (FIG. 5), the head mounted display 100 dynamically updates only the active display region BG (the second display region) and does not update the thumbnail display regions B1 to B6 (the first display regions) in the integrated image. Therefore, the head mounted display 100 only has to acquire the identification images once from the respective external devices. It is possible to reduce communication traffic between the head mounted display 100 and the external devices. It is possible to dynamically update the display image of the one external device selected by the user.

A-5. Additional Processing

Processing explained below may be added to the integrated image display processing (FIG. 5) or the integrated image update processing (FIG. 7). The processing explained below may be independently added or may be added in combination.

A-5-1. Additional Processing 1

In additional processing 1, the user implementes, "by directing attention to one external device", selection operation for selecting the one external device out of a plurality of external device. In this processing, the CPU 140 of the head mounted display 100 further includes an external-device specifying unit. The external-device specifying unit specifies, using any one of methods c1 to c6 explained below, an external device to which the user is assumed to direct attention and sets the external device as "an external device selected by the user".

(c1) Method of Specifying an External Apparatus Using a Directional Radio Wave

A directional radio antenna is provided in a position corresponding to a front surface outside the housing of the head mounted display 100, for example, a position corresponding to the middle of the forehead of the user (in other words, between the right optical-image display unit 26 and the left optical-image display unit 28). Then, an external device that receives a radio wave from the radio antenna can be estimated as an external device to which the user turns the head. By receiving, from the external device that receives the radio wave from the directional radio antenna, a message to that effect, the external-device specifying unit can specify an external device to which the user is assumed to direct attention.

(c2) Method of Specifying an External Device Using an Infrared Ray

A light emitting unit for an infrared ray is provided in the position corresponding to the front surface outside the housing of the head mounted display 100. Further, light receiving units for an infrared ray are provided in the external devices. Then, an external device that receives an infrared ray from the head mounted display 100 can be estimated as an external device to which the user turns the head. By receiving, from the external device that receives the infrared ray, a message to that effect, the external-device specifying unit can specify an external device to which the user is assumed to direct attention. A light receiving unit for an infrared ray may be provided in the head mounted display 100. Light emitting units for an infrared ray may be provided in the external devices. In this case, if a light emission pattern of the infrared ray is changed for each of the external devices, in the head mounted display 100 that receives the infrared ray, it is possible to specify an external device to which the user is assumed to direct attention.

(c3) Method of Specifying an External Device Using Position Information

The external-device specifying unit calculates a positional relation between the head mounted display 100 and the external devices using present position information of the head mounted display 100 obtained by the GPS module 134 (FIG. 2) and position information of the external devices acquired from the external devices. Thereafter, the external-device specifying unit can specify, on the basis of the direction of the head mounted display 100 (the direction of the head of the user) obtained by the nine-axis sensor 66 (FIG. 2), an external device to which the user is assumed to direct attention. Note that the external-device specifying unit can acquire position information of the external devices using, for example, wireless communication or short range wireless communication.

(c4) Method of Specifying an External Apparatus Using a Wireless Tag

Figure 8B:
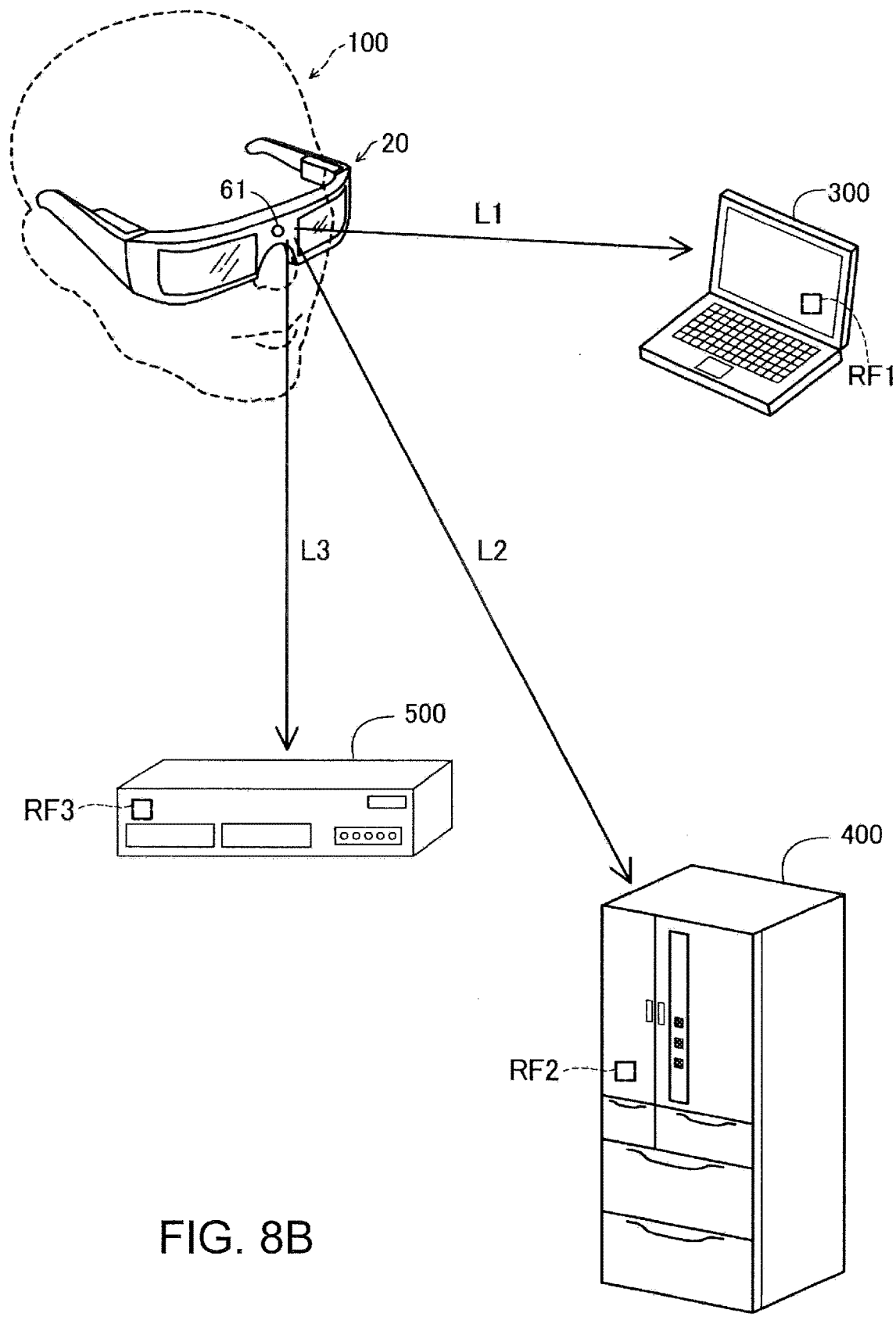
FIG. 8B is an explanatory diagram concerning a method of using a wireless tag of additional processing.

FIG. 8B is an explanatory diagram concerning a method of specifying an external device using a wireless tag in the additional processing 1. In FIG. 8B, for convenience of illustration, the head mounted display 100 shown in FIG. 1 is shown in a simplified form and only three external devices are shown. In this method, a distance measurement sensor 61 or a visible light camera is provided in the position corresponding to the front surface outside the housing of the head mounted display 100. Further, wireless tags RF1 to RF3 capable of performing short range wireless communication are incorporated in the external devices. The external-device specifying unit measures a distance L between one external device to which the user turns the head and the user (the distance measurement sensor 61). For the measurement, for example, a Time-of-Flight method can be used. Subsequently, the external-device specifying unit acquires distances L1 to L3 between external devices and the head mounted display 100 stored in the wireless tags RF1 to RF3 in advance respectively from the wireless tags RF1 to RF3 of the external devices. By comparing the measured distance L and the acquired distances L1 to L3, the external-device specifying unit can specify an external device that the user is assumed to direct attention. Note that the distances L1 to L3 between the external devices and the head mounted display 100 may be stored in the storing unit 120 of the head mounted display 100 in advance. Alternatively, the head mounted display 100 may dynamically calculate distances between the head mounted display 100 and the external devices. For the transmission of the distances L1 to L3, wireless communication may be used instead of the short range wireless communication. Further, to make it possible to specify two external devices at the same distance, the direction of the head mounted display 100 (the direction of the head of the user) obtained by the nine-axis sensor 66 (FIG. 2) may also be used.

(c5) Method of Specifying an External Device Using Image Processing

A visible light camera is provided in the position corresponding to the front surface outside the housing of the head mounted display 100. Appearance features of the external devices are stored in advance in the storing unit 120 of the head mounted display 100. The external-device specifying unit causes the visible light camera to pickup an image in a visual field direction (hereinafter referred to as "outside scene image" as well) of the user. By analyzing the outside scene image and collating the outside scene image with the appearance features of the external devices stored in the storing unit 120, the external-device specifying unit can specify an external device to which the user is assumed to direct attention. Methods explained below may be used.

The external-device specifying unit causes the visible light camera to acquire an outside scene image in a state in which the user of the head mounted display 100 points at one external device. The external-device specifying unit analyzes the outside scene image and specifies an external device present on an extended line of the finger of the user.

A pupil detecting unit including, for example, an infrared-ray receiving and emitting unit is provided on the housing inner side of the image display unit 20. The external-device specifying unit specifies, on the basis of the outside scene image picked up by the visible light camera and the movement of the eyes of the user detected by the pupil detecting unit, an external device to which the user directs the visual line.

(c6) Method of Specifying an External Device Using a Marker

A visible light camera is provided in the position corresponding to the front surface outside the housing of the head mounted display 100. Further, markers used in augmented reality (AR) processing are attached outside housings of the external devices. The external-device specifying unit causes the visible light camera to pick up an outside scene image. The external-device specifying unit can specify, according to the markers included in the outside scene image, an external device to which the user is assumed to direct attention.

When the additional processing 1 is applied to the integrated image display processing (FIG. 5), the generating unit 142 may carry out the establishment of connection in step S102 and the processing after step S102 on only the external device specified by any one of the methods explained above. The generating unit 142 may cause the PC 300 to execute steps S104 and S106 and may execute step S108 on only the external device specified by any one of the methods. The user can repeat, a plurality of times, the specifying of an external device using any one of the methods. Consequently, the generating unit 142 displays, in the thumbnail display regions B1 to B6 (the first display regions), as a list, at least identification images of external devices to which the user is assumed to have directed attention in the past among the plurality of external devices (the PC 300 to the game device 700) connected to the head mounted display 100 (the image display device). In this way, the user can select an external device displayed in the thumbnail display regions B1 to B6 by "directing attention" to the external device. Therefore, convenience for the user is improved. Further, for example, when a large number of external devices are connected to the head mounted display 100, it is possible to suppress complication of the thumbnail display regions B1 to B6.

When the additional processing 1 is applied to the integrated image display processing (FIG. 5), the generating unit 142 may carry out the processing in step S102 and subsequent steps on an external device set in advance and the external device specified by any one of the methods. The generating unit 142 may cause the PC 300 to execute steps S104 and S106 and may execute step S108 on the external device set in advance and the external devise specified by any one of the methods. "The external device set in advance" may be designated in advance by the user of the head mounted display 100, may be designated during factory shipment, or may be automatically designated according to a predetermined condition (e.g., the distance between the user and the external device is equal to or smaller than a predetermined threshold). Note that the distance between the user and the external device can be calculated by the methods c1 to c4. In this way, convenience for the user is improved. Further, it is possible to suppress complication of the thumbnail display regions B1 to B6.

When the additional processing 1 is applied to the integrated image update processing (FIG. 7), instead of step S200, the updating unit 144 may carry out the processing in step S202 and subsequent steps on the external device specified by any one of the methods. In this way, the updating unit 144 (the acquiring unit) acquires, from an external device to which the user is assumed to direct attention, a display image of the external device and updates the active display region BG (the second display region) of the integrated image using the acquired display image. In this way, the user can select an external device displayed in the active display region BG by "directing attention" to the external device. Therefore, convenience for the user is improved.

Note that it may be determined according to time in which the user turns the head to an external device (time in which the user direct attention to the external device) whether the additional processing 1 is applied to the integrated image display processing (FIG. 5) or the additional processing 1 is applied to the integrated image update processing (FIG. 7). For example, when the time is shorter than a predetermined threshold, the additional processing 1 may be applied to the integrated image display processing. When the time is longer than the predetermined threshold, the additional processing 1 may be applied to the integrated image update processing.

Note that the methods c1 to c6 are only examples. The external-device specifying unit can specify, according to the movement of the head of the user, the visual line of the user, or the like, an external device to which the user directs attention. The external-device specifying unit may specify a plurality of external devices at a time by combining the methods c1 to c6.

A-5-2. Additional Processing 2

In additional processing 2, in step S200 of the integrated image update processing (FIG. 7), a tag for providing augmented reality is attached to the one external device selected by the user. In this processing, the CPU 140 of the head mounted display 100 further includes an additional-presentation-information generating unit.

When the user turns to the direction of the external device selected in step S200 in FIG. 7, the additional-presentation-information generating unit generates information for additional presentation for identifying the external device. The information for additional presentation is information for adding, deleting, highlighting, and attenuating some information with respect to the external device. Specifically, the information for additional presentation is, for example, a balloon including a character string for informing that the external device is an external device selected by the user, a tag of a notebook shape, an icon (a picture, a character, a sign, etc.) for informing that the external device is an external device selected by the user, or a frame (a frame arranged to decorate the external device) for informing that the external device is an external device selected by the user. Note that the additional-presentation-information generating unit can determine, using methods same as the methods c1 to c6, whether the user turns to the direction of the external device selected in step S200.

The additional-presentation-information generating unit transmits the generated information for additional presentation to the image processing unit 160. The image processing unit 160, which receives the integrated image, performs the display processing explained above. As a result, when the user of the head mounted display 100 views the external device selected by the user in step S200, the user can visually recognize a virtual image representing the information for additional presentation (the tag) together with the external device.

Note that, instead of the additional-presentation-information generating unit, the CPU 140 of the head mounted display 100 may include an additional-presentation-information selecting unit. The additional-presentation-information selecting unit selects, from a plurality of kinds of information for additional presentation prepared in advance in the storing unit 120, an external server, or the like, information for additional presentation for informing that the external device is an external device selected by the user and transmits the selected information for additional presentation to the image processing unit 160.

In this way, according to the additional processing 2, the image display unit 20 can cause the user to visually recognize the information for additional presentation to be attached to the one external device selected in step S200 in FIG. 7. As a result, the user can distinguish the external device selected by the user and the other external device. Therefore, convenience for the user is improved.

B. Second Embodiment

In a second embodiment of the invention, a configuration is explained in which images of kinds different from the images exemplified in the first embodiment are used as identification images of an external device. In the following explanation, only components different from the components in the first embodiment in configurations and operations are explained. Note that, in the figures, components same as the components in the first embodiment are denoted by reference numerals and signs same as those in the first embodiment explained above. Detailed explanation of the components is omitted.

B-1. Configuration of an Image Display System

An image display system in the second embodiment is the same as the image display system in the first embodiment shown in FIG. 1 except that the image display system in the second embodiment includes a head mounted display 100*a* instead of the head mounted display 100.

B-2. Configuration of the Head Mounted Display

Figure 9:
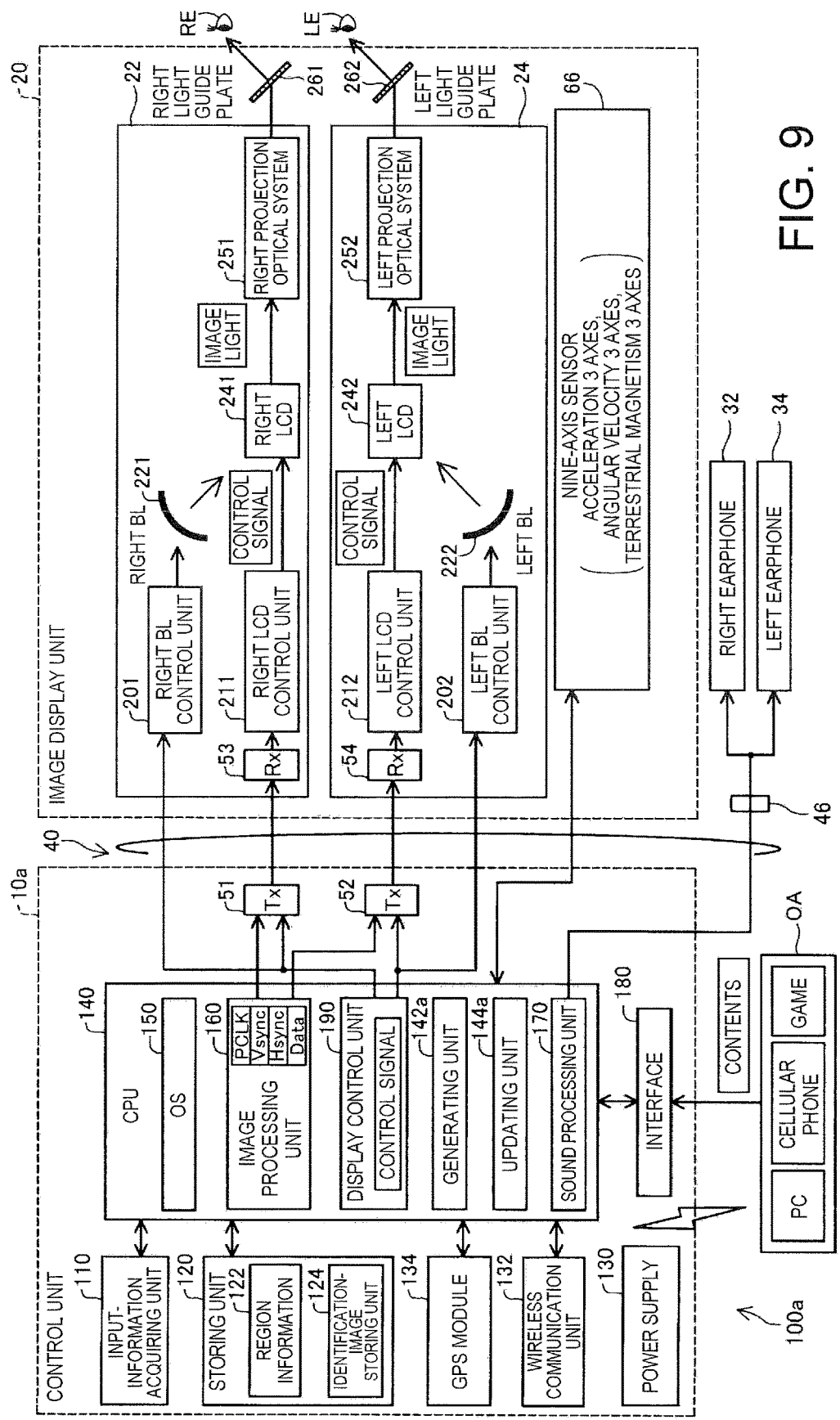
FIG. 9 is a functional block diagram showing the configuration of a head mounted display in a second embodiment.

FIG. 9 is a functional block diagram showing the configuration of the head mounted display 100*a* in the second embodiment. A difference from the first embodiment shown in FIG. 2 is that the head mounted display 100*a* includes a control unit 10*a* instead of the control unit 10. The control unit 10*a* includes a generating unit 142*a* instead of the generating unit 142 and includes an updating unit 144*a* instead of the updating unit 144. In the generating unit 142*a*, contents of the integrated image display processing are different from the contents of the integrated image display processing in the first embodiment shown in FIG. 5. In the updating unit 144*a*, contents of the integrated image update processing are different from the contents of the integrated image update processing in the first embodiment shown in FIG. 7.

In the integrated image display processing and the integrated image update processing in the second embodiment, any one of a4 and a5 below is used as "identification images of external devices" instead of "the identification images of external devices" exemplified in a1 to a3 in the first embodiment.

(a4) Images representing information for identifying external devices (examples of the information for identifying the external devices include IDs (e.g., product numbers or serial numbers) of the external devices, names (e.g., names of products) of the external devices, and states (e.g., properties of products) of the external devices)

(a5) Images representing symbols allocated to the external devices (the "symbols" are, for example, icons representing presence of the external devices, or figures or signs abstracting and representing the external devices)

B-3. Integrated Image Display Processing

Figure 10:
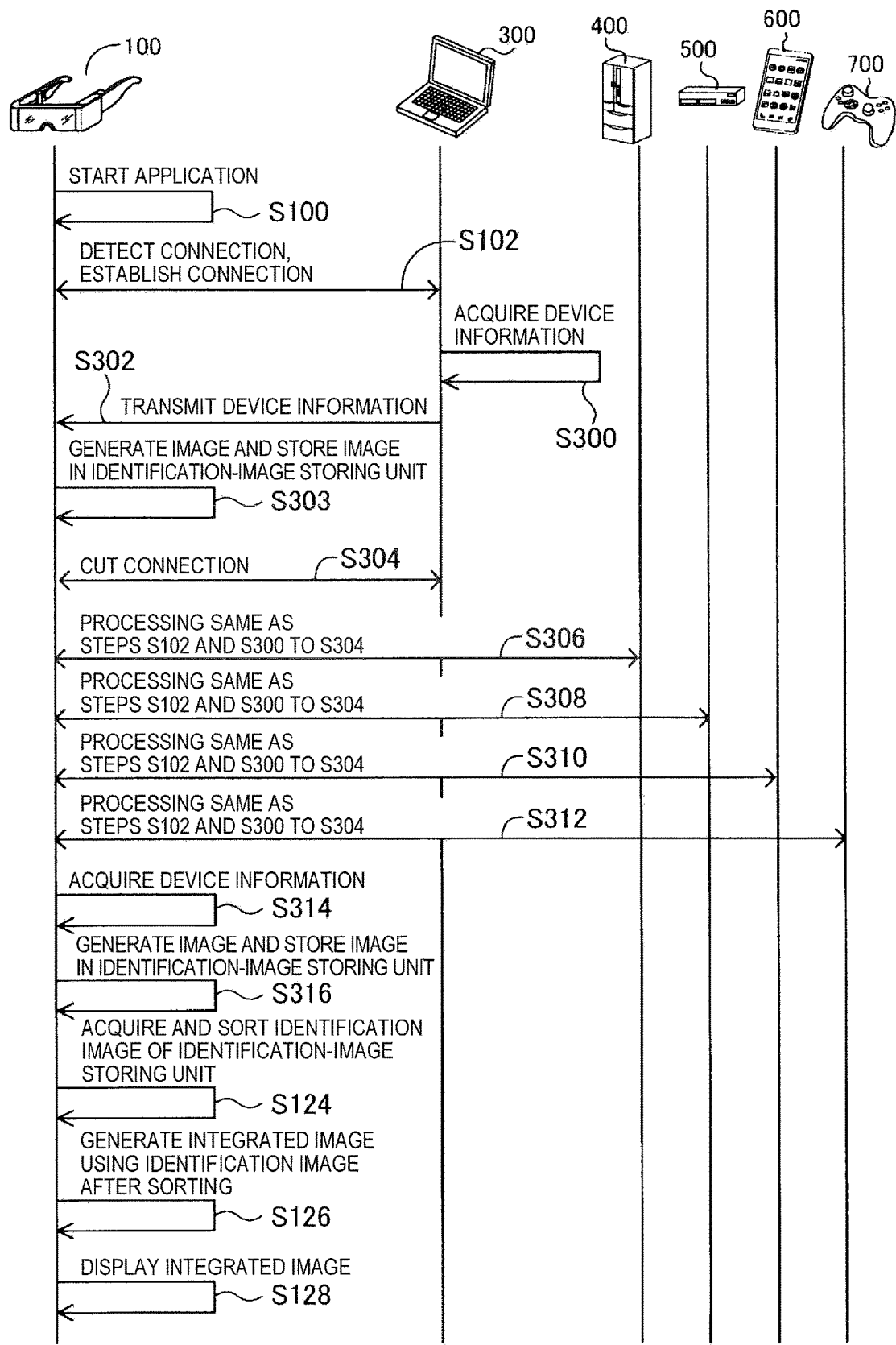
FIG. 10 is a sequence chart showing a procedure of integrated image display processing in the second embodiment.

FIG. 10 is a sequence chart showing a procedure of the integrated image display processing in the second embodiment. As in the first embodiment (FIG. 5), the integrated image display processing in the second embodiment is processing for generating an integrated image and causing the head mounted display 100*a* to display the integrated image. A difference from the first embodiment is that the images exemplified in a4 and a5 are used as identification images of external devices. The integrated image display processing is mainly performed by the generating unit 142*a*.

First, as in the first embodiment explained with reference to FIG. 5, an application is started (step S100) and connection between the head mounted display 100*a* and the PC 300 is established (step S102).

In step S300, the PC 300 acquires device information of the PC 300. Specifically, the PC 300 acquires any one kind of information (which does not have to be an image) described in b4 and b5 below. Note that b4 corresponds to a4 and b5 corresponds to a5.

(b4) Information for identifying the PC 300 (for example, information representing an ID such as a product number or a serial number of the PC 300, a name of the PC 300, and a state such as a property of the PC 300)

(b5) An image representing a symbol of the PC 300 (for example, an icon image of the PC 300)

In step S302, the PC 300 transmits the acquired device information to the head mounted display 100*a*. The generating unit 142*a* of the head mounted display 100*a* acquires the device information via the wireless communication unit 132. In this case, the generating unit 142*a* and the wireless communication unit 132 function as the "acquiring unit".

In step S303, the generating unit 142*a* generates an image representing the acquired device information. The generating unit 142*a* causes the identification-image storing unit 124 to store the generated image as "an identification image of an external device". Note that, as in b5 above, when the device information received from the PC 300 is in a form of an image, the generation of an image representing the device information can be omitted.

In step S304, the generating unit 142*a* cuts the connection between the head mounted display 100*a* and the PC 300. By immediately cutting unnecessary connection in this way, it is possible to reduce communication traffic and power consumption.

In step S306, the generating unit 142*a* carries out processing same as step S102 and steps S300 to S304 between the head mounted device 100*a* and the home electric appliance 400. Similarly, the generating unit 142*a* carries out the same processing between the head mounted display 100*a* and the AV device 500 in step S308, carries out the same processing between the head mounted display 100*a* and the portable terminal 600 in step S308, and carries out the same processing between the head mounted display 100*a* and the game device 700 in step S310. As a result, in the identification-image storing unit 124, identification images of all the external devices connected to the head mounted display 100*a* are stored.

In Step S314, the generating unit 142*a* acquires device information of the head mounted display 100. Specifically, the generating unit 142*a* acquires information of any one of b4 and b5 concerning the head mounted display 100*a*.

In step S316, the generating unit 142*a* generates an image representing the acquired device information and causes the identification-image storing unit 124 to store the image as "an identification image of an image display apparatus". As a result of steps S314 and S316, the identification image of the head mounted display 100*a* itself is stored in the identification-image storing unit 124.

Thereafter, as in the first embodiment explained with reference to FIG. 5, the generating unit 142*a* sorts the plurality of identification images stored in the identification-image storing unit 124 (step S124), generates an integrated image (step S126), and causes the head mounted display 100*a* to display the integrated image (step S128). Details are as explained with reference to FIG. 5.

Figure 11:
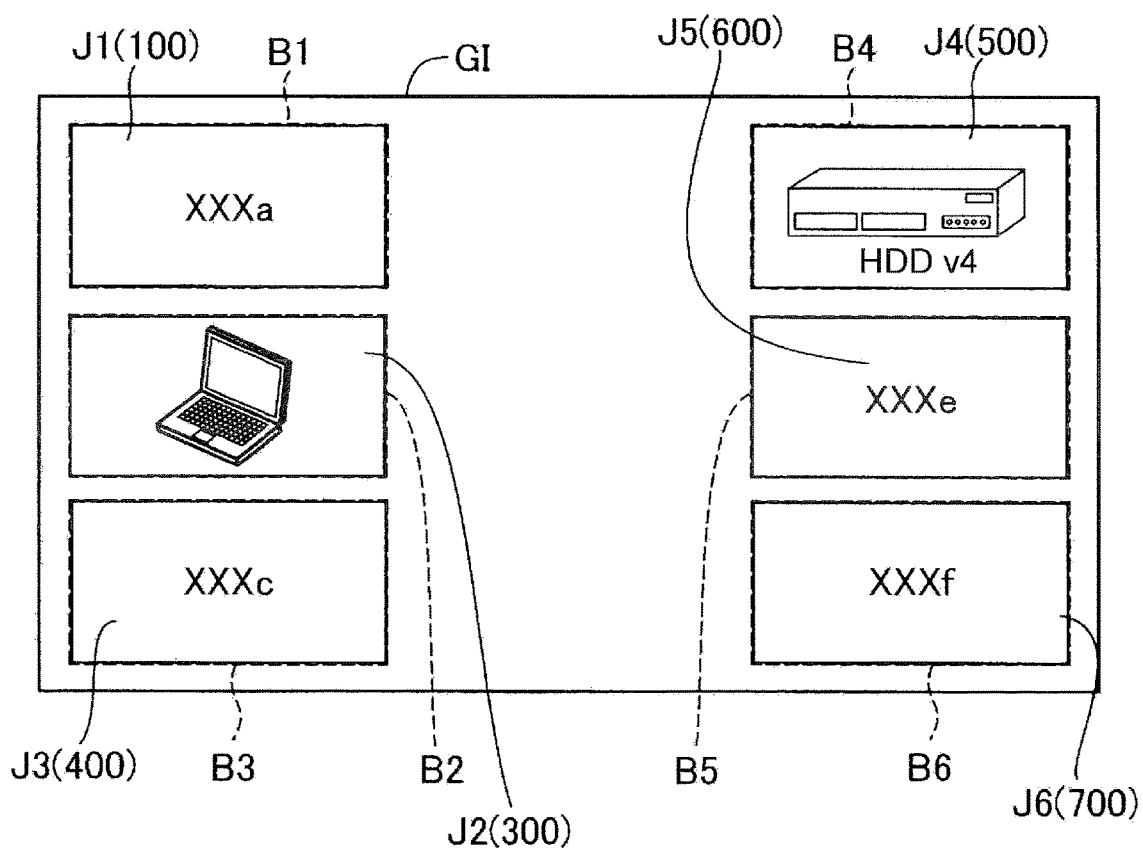
FIG. 11 is an explanatory diagram showing an example of an integrated image generated in step S126 of the integrated image display processing in the second embodiment.

FIG. 11 is an explanatory diagram showing an example of the integrated image generated in step S126 of the integrated image display processing in the second embodiment. In the thumbnail display region B1 of the integrated image GI, as the identification image of the head mounted display 100*a*, an image J1 representing a product number of the head mounted display 100*a* is arranged. Similarly, in the thumbnail display region B2, as the identification image of the PC 300, an icon image J2 of the PC 300 is arranged. In the thumbnail display region B3, as the identification image of the home electric appliance 400, an image J3 representing a name of a product of the home electric appliance 400 is arranged. In the thumbnail display region B4, as the identification image of the AV device 500, an icon image J4 of the AV device 500 is arranged. In the thumbnail display region B5, as the identification image of the portable terminal 600, an image J5 representing a product number of the portable terminal 600 is arranged. In the thumbnail display region B6, as the identification image of the game device 700, an image J6 representing a product number of the game device 700 is arranged.

B-4. Integrated Image Update Processing

Figure 12:
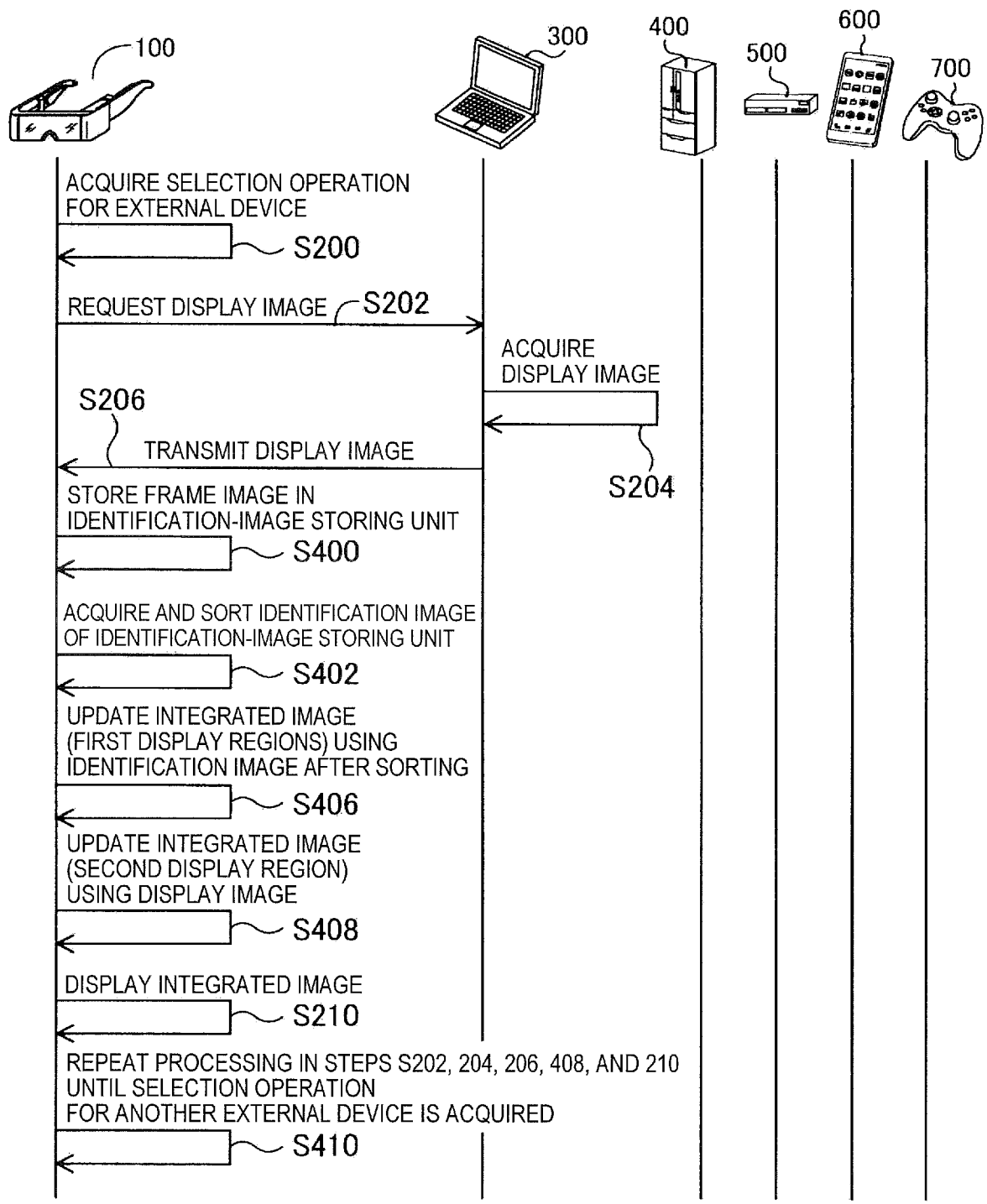
FIG. 12 is a sequence chart showing a procedure of integrated image update processing in the second embodiment.

FIG. 12 is a sequence chart showing a procedure of the integrated image update processing in the second embodiment. As in the first embodiment (FIG. 7), the integrated image update processing in the second embodiment is processing for dynamically displaying a second display region of an integrated image. Differences from the first embodiment are that the images of a4 and a5 are used as identification images of external devices and the identification images of the external devices in the identification-image storing unit 124 are updated using display images acquired from the external devices to update the second display region. The integrated image update processing is mainly executed by the updating unit 144*a*.

As in the first embodiment explained with reference to FIG. 7, the updating unit 144a acquires selection operation for selecting one external device out of a plurality of external devices (step S200) and acquires an image (a frame image) of a display screen from the selected one external device (steps S202 to S206).

In step S400, the updating unit 144a causes the identification-image storing unit 124 to store the acquired frame image as "an identification image of an external device". In this case, the updating unit 144a overwrites an identification image of the same external device already stored in step S303 of the integrated image display processing (FIG. 10). Note that, in step S400, the updating unit 144a may cause, after reducing the acquired frame image, the identification-image storing unit 124 to store the frame image.

In step S402, the updating unit 144a acquires the plurality of identification images stored in the identification-image storing unit 124 and sorts the acquired identification images according to a predetermined condition. Details are the same as step S124 of the integrated image display processing (FIG. 5).

In step S404, the updating unit 144a updates the thumbnail display regions B1 to B6 (the first display regions) of the integrated image using the identification images after the sorting. Details are the same as step S126 of the integrated image display processing (FIG. 5).

In step S408, the updating unit 144a updates, using the frame image acquired in step S206, the active display region BG (the second display region) in the integrated image updated in step S404.

In step S210, the updating unit 144a causes the head mounted display 100a to display an integrated image after the update. Details are the same as step S128 of the integrated image display processing (FIG. 5).

In step S410, the updating unit 144a repeats the processing in steps S202, S204, S206, S408, and S210 for the selected external device (the PC 300) until the updating unit 144a acquires selection operation for another external device different from the selection operation for the external device acquired in step S200. On the other hand, when the updating unit 144a acquires the selection operation for another external device, the updating unit 144a executes the series of processing in steps S202 to S410 on the other external device.

Figure 13:
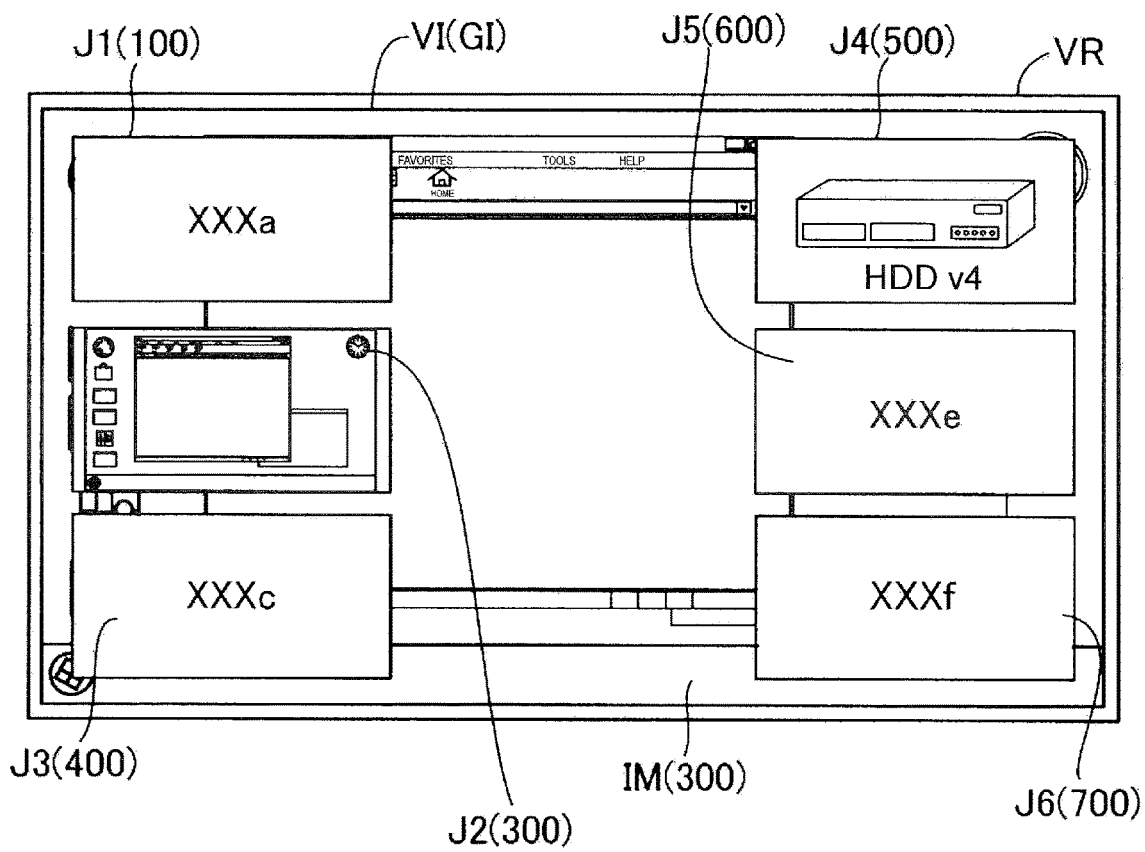
FIG. 13 is an explanatory diagram showing a state in which an integrated image, in which first display regions and a second display region are updated, is displayed in the head mounted display.

FIG. 13 is an explanatory diagram showing a state in which an integrated image, in which the first display regions and the second display region are updated, is displayed in the head mounted display 100a. As shown in FIG. 13, in the visual field VR, a user of the head mounted display 100a can visually recognize, as the virtual image VI, the integrated image GI including a plurality of identification images of a plurality of external devices connected to the head mounted display 100a and a display image of one external device selected out of the plurality of external devices. In an example shown in FIG. 13, the plurality of identification images of the plurality of external devices are the identification image J1 of the head mounted display 100a, the identification image J2 of the PC 300, the identification image J3 of the home electric appliance 400, the identification image J4 of the AV device 500, the identification image J5 of the portable terminal 600, and the identification image J6 of the game device 700 explained with reference to FIG. 11. As the identification image J2 of the PC 300, the identification image after the update in step S400 of the integrated image update processing (FIG. 12) is displayed. In the example shown in FIG. 13, the display image of the selected one external device is the display image IM, which is an image displayed by the PC 300. Note that, as in FIG. 8A, in FIG. 14, a background, which is originally transmitted through the virtual image VI, is not shown.

As explained above, with the integrated image display processing (FIG. 10) and the integrated image update processing (FIG. 12) in the second embodiment, it is possible to obtain effects same as the effects in the first embodiment. Further, in the integrated image display processing and the integrated image update processing in the second embodiment, as the identification images of the external devices, images of kinds different from the images exemplified in the first embodiment can be used.

B-5. Additional Processing

In the second embodiment, as in the first embodiment, the additional processing 1 and the additional processing 2 can be applied.

C. Third Embodiment

In a third embodiment of the invention, a configuration is explained in which the thumbnail display regions B1 to B6 (the first display regions) of the integrated image are virtual display regions. In the following explanation, only components different from the components in the first embodiment in configurations and operations are explained. Note that, in the figures, components same as the components in the first embodiment are denoted by reference numerals and signs same as those in the first embodiment explained above. Detailed explanation of the components is omitted.

C-1. Configuration of an Image Display System

An image display system in the third embodiment is the same as the image display system in the first embodiment shown in FIG. 1 except that the image display system in the third embodiment includes a head mounted display 100b instead of the head mounted display 100.

C-2. Configuration of the Head Mounted Display

Figure 14:
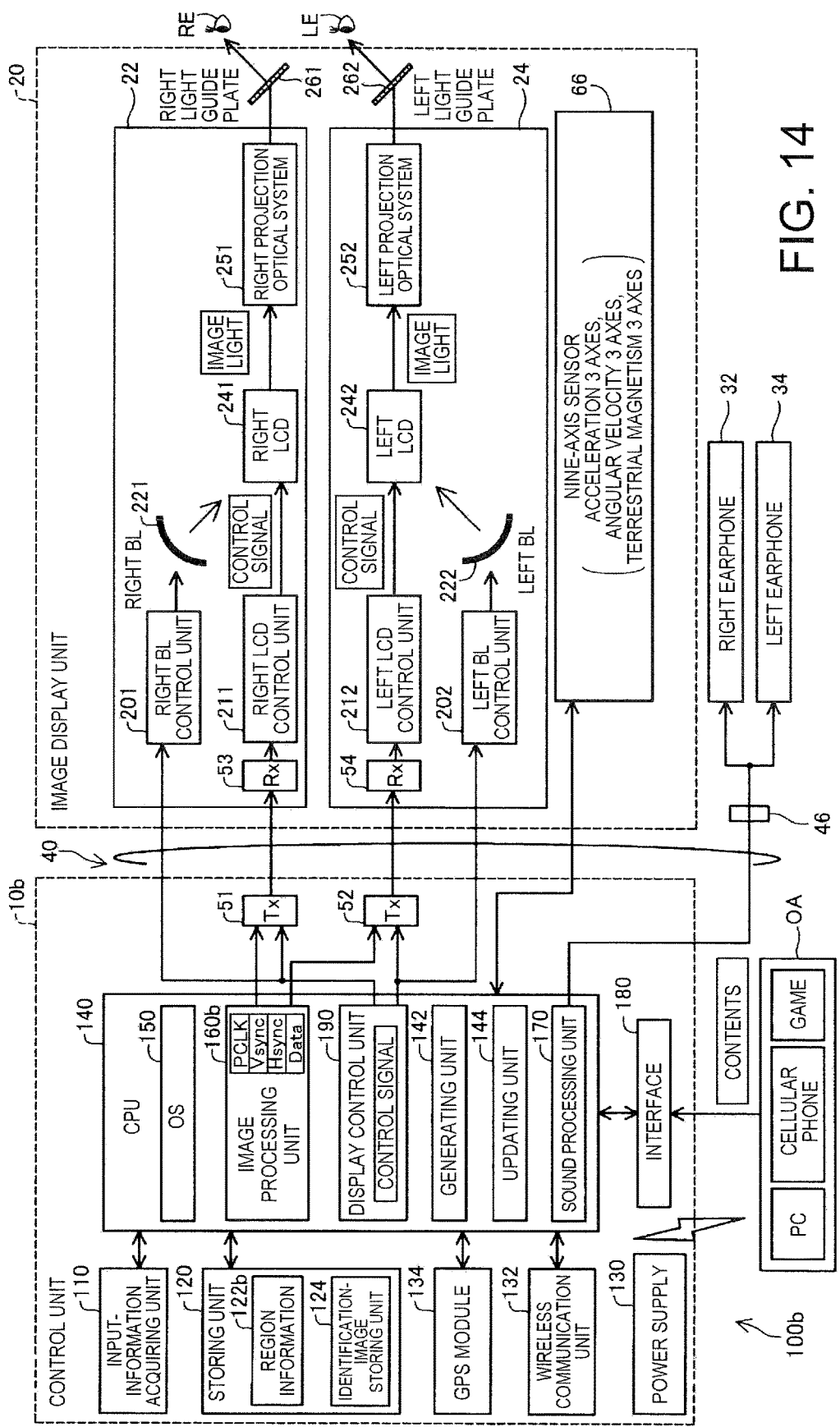
FIG. 14 is a functional block diagram showing the configuration of a head mounted display in a third embodiment.

FIG. 14 is a functional block diagram showing the configuration of the head mounted display 100b in the third embodiment. A difference from the first embodiment shown in FIG. 2 is that the head mounted display 100b includes a control unit 10b instead of the control unit 10. The control unit 10b includes region information 122b instead of the region information 122 and includes an image processing unit 160b instead of the image processing unit 160.

Figure 15:
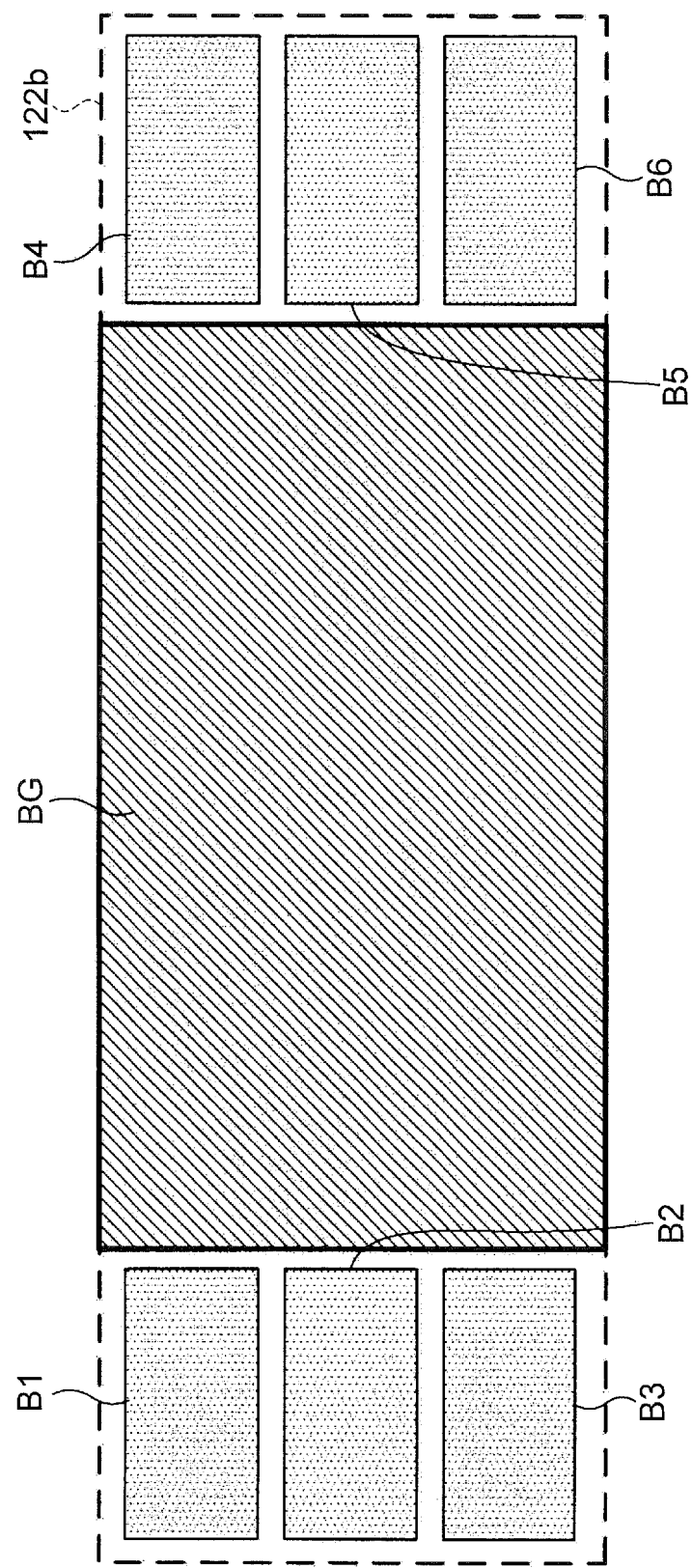
FIG. 15 is an explanatory diagram showing an example of region information in the third embodiment.

FIG. 15 is an explanatory diagram showing an example of the region information 122b in the third embodiment. As in the first embodiment shown in FIG. 3, the region information 122b in the third embodiment includes the six thumbnail display regions B1 to B6 (the first display regions) and the active display region BG (the second display region). The regions are used as explained with reference to FIG. 3. The thumbnail display regions B1 to B3 and the thumbnail display regions B4 to B6 are arranged on the outer sides on the left and the right in the horizontal direction across the active display region BG. An aspect ratio of the active display region BG is the same as an aspect ratio of a generable region of image light generated by the display driving unit, in other words, an aspect ratio of display devices (in FIG. 2, the right LCD 241 and the left LCD 242) of the head mounted display 100b.

In the example shown in FIG. 15, the thumbnail display regions B1 to B3 are arranged on the outer side on the left side of the region 122b to be adjacent to one another in the vertical direction. The thumbnail display regions B4 to B6 are arranged on the outer side on the right side of the region 122 to be adjacent to one another in the vertical direction. The thumbnail display regions B1 to B6 are regions having the same size. In FIG. 15, the thumbnail display regions B1 to B6 are hatched by dots. The active display region BG is hatched by diagonal lines.

Note that the arrangement and the size of the thumbnail display regions B1 to B6 shown in FIG. 15 are examples and can be arbitrarily set. The thumbnail display regions B1 to B6 are only have to be arranged on the outer side of the active display region BG (the second display region). Therefore, for example, the thumbnail display regions B1 to B6 may be arranged on the outer side on the upper side or the outer side on the lower side of the active display region BG. The thumbnail display regions B1 to B6 may be arranged to surround the four sides on the outer side of the active display region BG. The thumbnail display regions B1 to B6 may have sizes different from one another. Further, the thumbnail display regions B1 to B6 may partially overlap one another.

C-3. Integrated Image Display Processing

A procedure of integrated image display processing in the third embodiment is the same as the procedure in the first embodiment shown in FIG. 5 except procedures d1 and d2 described below.

(d1) In step S126, the generating unit 142 generates an integrated image using the region information 122 explained with reference to FIG. 15.

(d2) In step S128, the image processing unit 160b causes the head mounted display 100b to display only an image of a portion equivalent to the active display region BG (the second display region; the region hatched by diagonal lines in FIG. 15) in the integrated image received from the generating unit 142. The image processing unit 160b is triggered by acquisition of predetermined operation from the user to cause the head mounted display 100b to display images of portions equivalent to the thumbnail display regions B1 to B6 (the first display regions; the regions hatched by dots in FIG. 15). As the predetermined operation, for example, operation of an input device (e.g., a touch pad, a cross key, a foot switch, gesture detection, visual line detection, touch detection, or a microphone) included in the head mounted display 100b by the user can be used.

Figure 16:
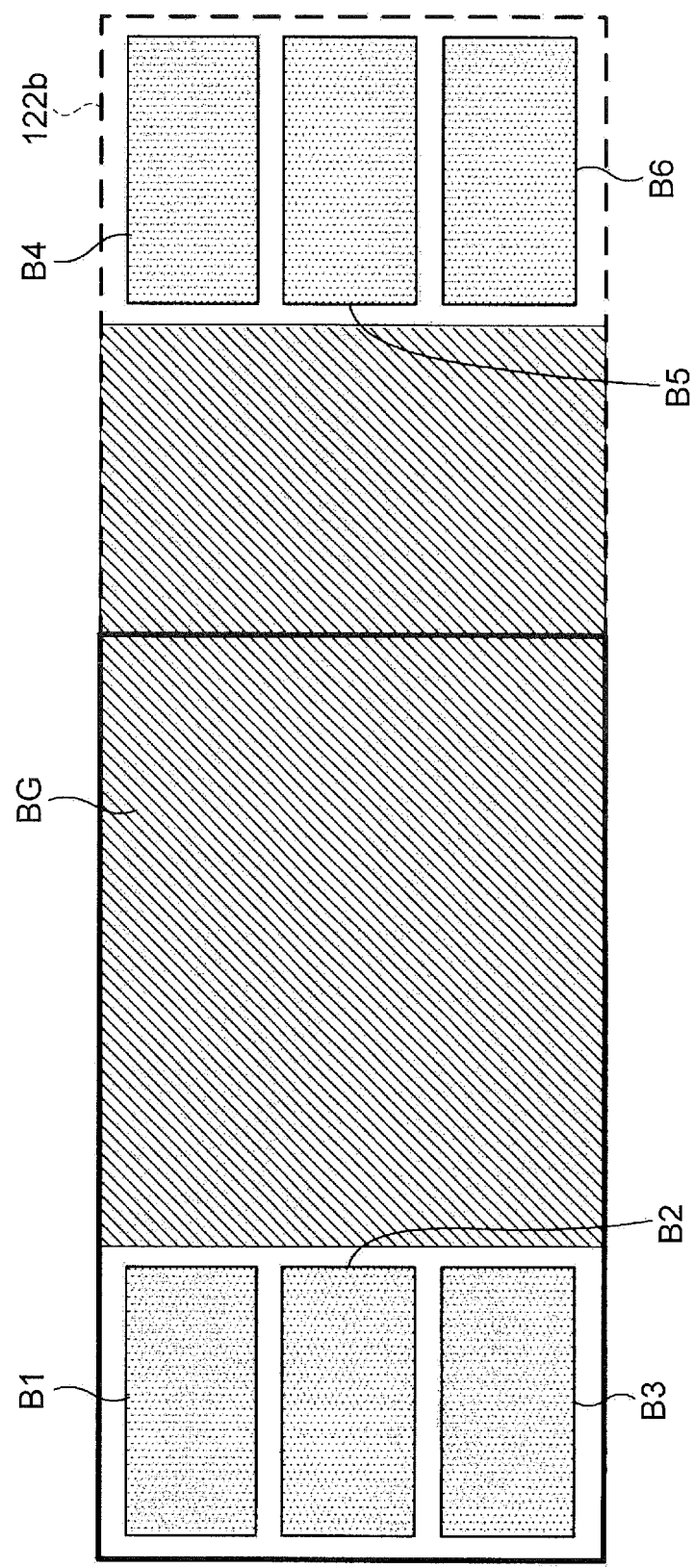
FIG. 16 is an explanatory diagram for explaining an example of the operation of an image processing unit.

FIG. 16 is an explanatory diagram for explaining an example of the operation of the image processing unit 160b. For example, the image processing unit 160b is triggered by a touch on the left holding unit 23 of the head mounted display 100b by the user to slide a range of an integrated image displayed on the head mounted display 100b to the left side as shown in FIG. 16. Consequently, the image processing unit 160b can cause the user to visually recognize (a part of) the first display regions and (apart of) the second display region. Similarly, the image processing unit 160b is triggered by a touch on the right holding unit 21 of the head mounted display 100b by the user to slide the range of the integrated image displayed on the head mounted display 100b to the right side. Note that, when the thumbnail display regions B1 to B6 (the first display regions) are provided above and below the active display region BG (the second display region) in the region information 122b, the image processing unit 160b can be triggered by a touch on upper and lower parts of a housing of the head mounted display 100b by the user to perform the same processing.

C-4. Integrated Image Update Processing

A procedure of integrated image update processing in the third embodiment is the same as the procedure in the first embodiment shown in FIG. 7 except a procedure (same as d2) of the image processing unit 160b in step S210.

As explained above, with the integrated image display processing (FIG. 5) and the integrated image update processing (FIG. 7) in the third embodiment, it is possible to obtain effects same as the effects in the first embodiment. Further, with the integrated image display processing and the integrated image update processing in the third embodiment, when there is no operation by the user, the image display unit 20 can cause the user to visually recognize a portion of the integrated image equivalent to the active display region BG (the second display region). When there is operation by the user, the image display unit 20 can cause the user to visually recognize portions of the integrated image equivalent to the thumbnail display regions B1 to B6 (the first display regions). As a result, with the head mounted display 100b (the image display device) in this embodiment, it is possible to provide virtual screens (the thumbnail display regions B1 to B6; the first display regions) on the outer side of a normal screen (the active display region BG; the second display region) and switch display of the normal screen and the virtual screens according to operation by the user. As a result, it is possible to improve convenience for the user.

C-5. Additional Processing

In the third embodiment, as in the first and second embodiments, the additional processing 1 and the additional processing 2 can be applied.

D. Fourth Embodiment

In a fourth embodiment of the invention, a configuration is explained in which processing load distribution is attained by causing another information processing device (hereinafter referred to as "server") to carry out processing carried out by the head mounted display in the first embodiment. In the following explanation, only components different from the components in the first embodiment in configurations and operations are explained. Note that, in the figures, components same as the components in the first embodiment are denoted by reference numerals and signs same as those in the first embodiment explained above. Detailed explanation of the components is omitted.

D-1. Configuration of an Image Display System

Figure 17:
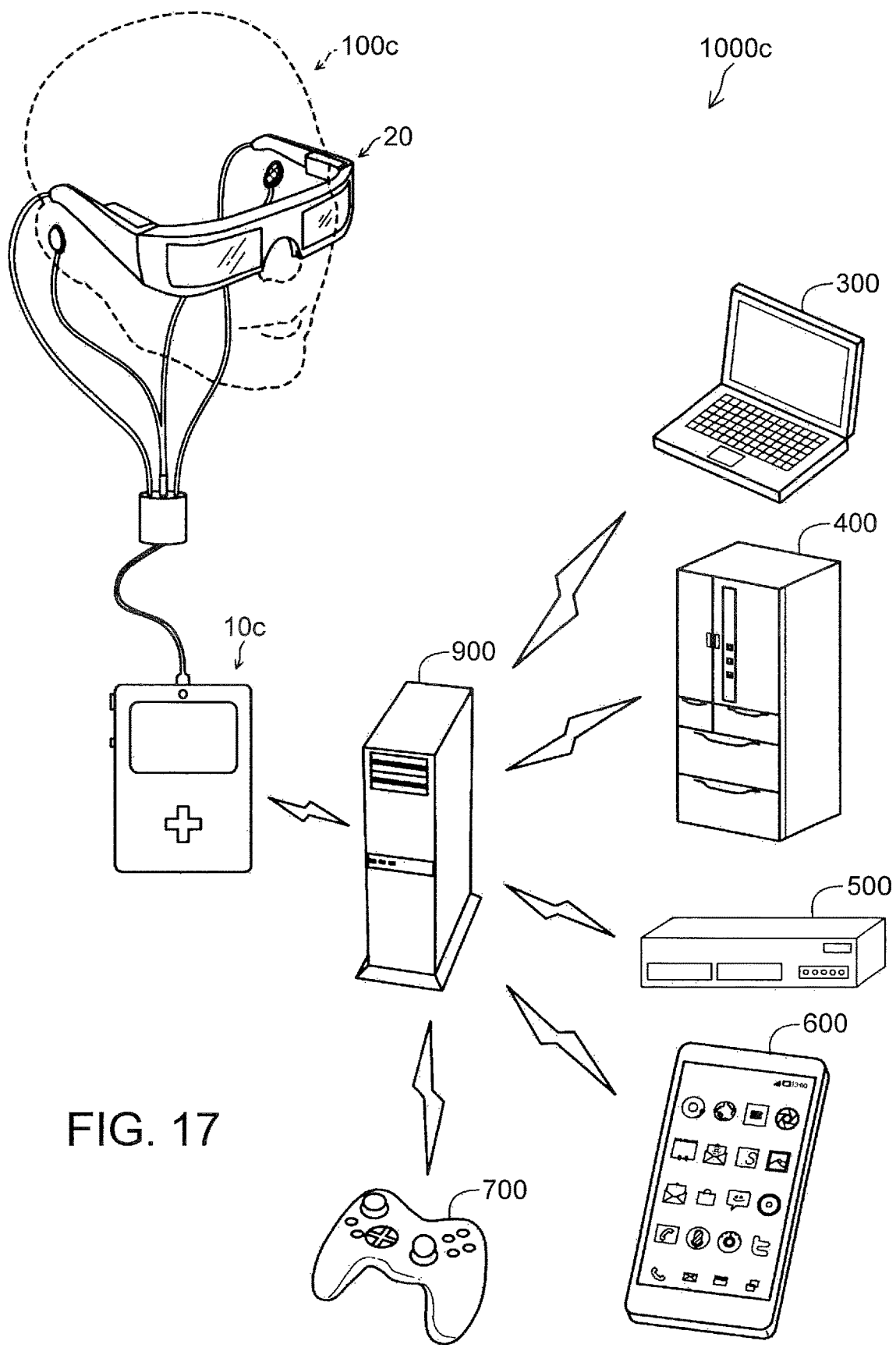
FIG. 17 is an explanatory diagram showing the schematic configuration of an image display system in a fourth embodiment.

FIG. 17 is an explanatory diagram showing the schematic configuration of an image display system 1000c in the fourth embodiment. Differences from the first embodiment shown in FIG. 1 are that a head mounted display 100c is provided instead of the head mounted display 100 and a server 900 is provided. In the fourth embodiment, the server 900 generates an "integrated image" obtained by integrating displays in external devices and causes the head mounted display 100c to display the integrated image.

The head mounted display 100 is connected to the server 900 to be capable of performing wireless communication or wired communication. Similarly, the external devices (the PC 300 to the game device 700) are connected to the server 900 to be capable of performing wireless communication or wired communication. Network devices such as a router and an access point, various adapters, and the like may be provided between the head mounted display 100c and the server 900 or between the server 900 and the external devices.

D-2. Configurations of the Head Mounted Display and the Server

The head mounted display 100c in the fourth embodiment is the same as the head mounted display 100 in the first embodiment shown in FIG. 2 except that the head mounted display 100c does not include the region information 122, the identification-image storing unit 124, the generating unit 142, and the updating unit 144.

Figure 18:
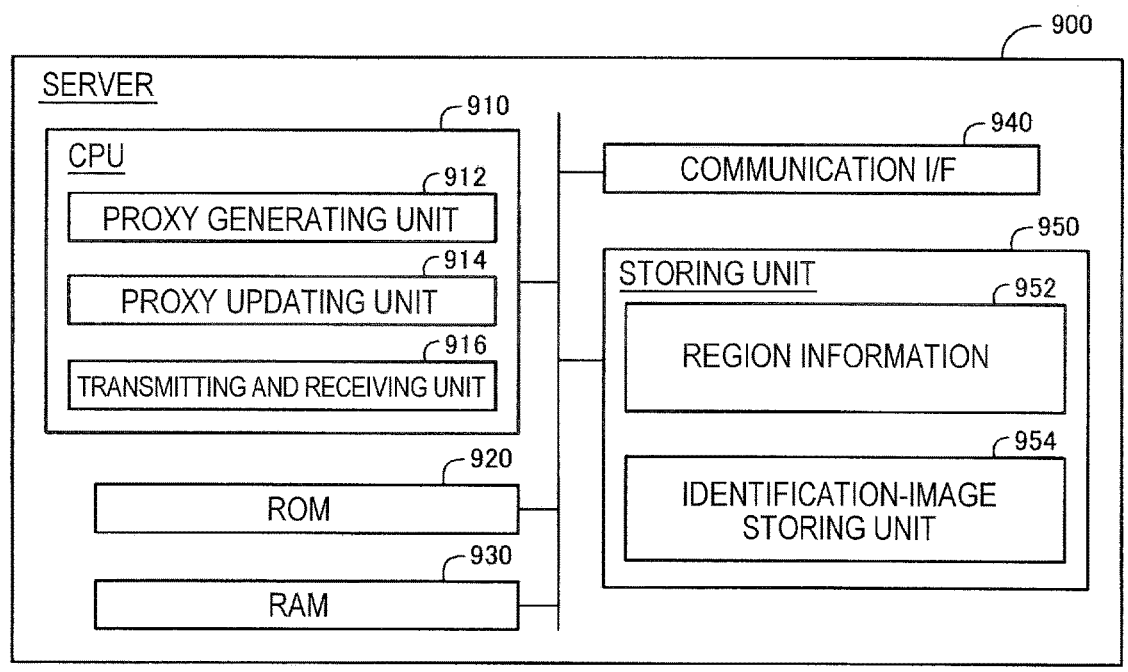
FIG. 18 is a functional block diagram showing the configuration of a server.

FIG. 18 is a functional block diagram showing the configuration of the server 900. The server 900 includes a CPU 910, a ROM 920, a RAM 930, a communication interface (I/F) 940, and a storing unit 950. The units are connected to one another by a not-shown bus.

The CPU 910 controls the units of the server 900 by expanding a computer program, which is stored in the ROM 920 or the storing unit 950, on the RAM 930 and executing the computer program. Besides, the CPU 910 also functions as a proxy generating unit 912, a proxy updating unit 914, and a transmitting and receiving unit 916. The proxy generating unit 912 executes the integrated image display processing and generates an integrated image. The proxy generating unit 912 implements a function of a "proxy generating unit" that generates an integrated image including first display regions and a second display region. The proxy updating unit 914 executes integrated image update processing explained below and updates the integrated image. The transmitting and receiving unit 916 transmits and receives a request and the integrated image between the server 900 and the head mounted display 100c in the integrated image display processing and integrated image update processing. The transmitting and receiving unit 916 implements a function of a "transmitting unit" that transmits the integrated image to the head mounted display.

The communication interface 940 includes a wireless communication interface and a wired communication interface. The wireless communication interface includes a not-shown transmission and reception circuit and performs demodulation of a radio wave received via an antenna and generation of data and generation and modulation of a radio wave to be transmitted via the antenna. The wired communication interface is connected to other devices via a wired cable.

The storing unit 950 is configured by a ROM, a RAM, a DRAM, a hard disk, or the like. The storing unit 950 includes region information 952 and an identification-image storing unit 954. Details of the region information 952 are the same as the details of the region information 122 in the first embodiment shown in FIG. 3. The identification-image storing unit 954 is a storing unit for storing identification images of external devices collected in the integrated image display processing.

D-3. Integrated Image Display Processing

A procedure of the integrated image display processing in the fourth embodiment is substantially the same as the procedure in the first embodiment shown in FIG. 5. However, in the explanation concerning FIG. 5, the "head mounted display 100" shall read the "server 900", the "generating unit 142" shall read the "proxy generating unit 912", the "storing unit 120" shall read the "storing unit 950", the "region information 122" shall read the "region information 952", and the "identification-image storing unit 124" shall read the "identification-image storing unit 954". Besides, the steps S118 and S128 shall read as follows.

Step S118: The proxy generating unit 912 of the server 900 acquires an image of a display screen of the head mounted display 100c via the transmitting and receiving unit 916.

Step S128: The proxy generating unit 912 of the server 900 transmits the integrated image generated in step S126 to the head mounted display 100c via the transmitting and receiving unit 916. In the head mounted display 100c that receives the integrated image, the display processing explained with reference to FIG. 2 is performed by the image processing unit 160.

D-4. Integrated Image Update Processing

A procedure of the integrated image update processing in the fourth embodiment is substantially the same as the procedure in the first embodiment shown in FIG. 7. However, in the explanation concerning FIG. 5, the "head mounted display 100" shall read the "server 900", the "updating unit 144" shall read the "proxy updating unit 914", the "storing unit 120" shall read the "storing unit 950", the "region information 122" shall read the "region information 952", and the "identification-image storing unit 124" shall read the "identification-image storing unit 954". Besides, the steps S200 and S210 shall read as follows.

Step S200: The proxy updating unit 914 of the server 900 acquires information concerning the one external device selected by the user of the head mounted display 100c via the transmitting and receiving unit 916. The information concerning the one external device indicates information (e.g., a device name or a network address) capable of specifying the external device.

Step S210: The proxy updating unit 914 of the server 900 transmits the integrated image after the update in step S208 to the head mounted display 100c via the transmitting and receiving unit 916. In the head mounted display 100c that receives the integrated image, the display processing explained with reference to FIG. 2 is performed by the image processing unit 160.

As explained above, with the integrated image display processing and the integrated image update processing in the fourth embodiment, it is possible to obtain effects same as the effects in the first embodiment. Further, according to the fourth embodiment, since the server 900 executes the integrated image display processing and the integrated image update processing, it is possible to reduce a processing load in the head mounted display 100c. Note that, although the fourth embodiment is explained as a modification of the first embodiment, the form of the fourth embodiment including the server 900 can be applied to the second and third embodiments as well. Further, the server 900 may apply compression and conversion of resolution of the integrated image to be transmitted to the head mounted display 100c. Then, it is possible to further reduce a processing load in the head mounted display 100c and reduce wireless communication traffic between the server 900 and the head mounted display 100c.

D-5. Additional Processing

In the fourth embodiment, as in the first to third embodiments, the additional processing 1 and the additional processing 2 can be applied.

E. Modifications

In the embodiments, a part of the components implemented by hardware may be replaced with software. Conversely, a part of the components implemented by software may be replaced with hardware. Besides, modifications explained below are also possible.

Modification 1

In the embodiments, the configuration of the image display system is exemplified. However, the configuration of the image display system can be arbitrarily set without departing from the spirit of the invention. For example, addition, deletion, conversion, and the like of the devices configuring the image display system can be performed. A change in a network configuration of the devices configuring the image display system can be performed.

For example, as the image display device, a projector, a monitor, a television, and the like can be adopted instead of the head mounted display.

For example, as a kind of the external device in the embodiments, a cloud server provided via the Internet INT may be used. In this case, as in the embodiments, the generating unit and the updating unit can obtain effects same as the effects in the first to third embodiments by performing processing same as the processing in the first to third embodiments.

Modification 2

In the embodiments, the configuration of the head mounted display is exemplified. However, the configuration of the head mounted display can be arbitrarily set without departing from the spirit of the invention. For example, addition, deletion, conversion, and the like of the components can be performed.

The allocation of the components to the control unit and the image display unit in the embodiments is only an example. Various forms can be adopted. For example, forms explained below may be adopted. (i) A form in which processing functions of the CPU, the memory, and the like are mounted on the control unit and only a display function is mounted the image display unit, (ii) a form in which processing functions of the CPU, the memory, and the like are mounted on both of the control unit and the image display unit, (iii) a form in which the control unit and the image display unit are integrated (e.g., the control unit is included in the image display unit and functions as an eyeglass-type wearable computer), (iv) a form in which a smartphone and a portable game machine are used instead of the control unit, (v) a form in which the connecting unit (a cord) is eliminated by enabling wireless communication and wireless power feed to the control unit and the image display unit, and (vi) a form in which the touch pad is eliminated from the control unit and the touch pad is provided in the image display unit.

In the embodiments, for convenience of explanation, the control unit includes the transmitting unit and the image display unit includes the receiving unit. However, both of the transmitting unit and the receiving unit in the embodiment include a function capable of performing bidirectional communication and can function as a transmitting and receiving unit. For example, the control unit shown in FIG. 5 is connected to the image display unit via a wired signal transmission line. However, the control unit and the image display unit may be connected via a wireless signal transmission line of a wireless LAN, infrared communication, Bluetooth, or the like.

For example, the configurations of the control unit and the image display unit shown in FIG. 2 can be arbitrarily changed. Specifically, for example, the control unit can include various input devices (e.g., an operation stick, a keyboard, and a mouse) besides the various input devices (the touch pad, the cross key, the foot switch, the gesture detection, the visual line detection, and the microphone) explained above. In the embodiments, the secondary battery is used as the power supply. However, the power supply is not limited to the secondary battery. Various batteries can be used. For example, a primary battery, a fuel battery, a solar battery, and a thermal battery may be used.

In the embodiments, for example, the head mounted display is the transmission-type head mounted display of a binocular type. However, the head mounted display may be a head mounted display of a monocular type. The head mounted display may be configured as a non-transmission-type head mounted display in which transmission of an outside scene is blocked in a state in which the user wears the head mounted display. In the embodiments, the image display unit of the head mounted display is worn like eyeglasses. However, for example, the head mounted display may adopt image display units of other shapes such as an image display unit of a type worn like a hat. As the earphones, earphones of an ear hook type and a headband type may be adopted. The earphones may be omitted. Further, the head mounted display may be configured as, for example, a head-up display (HUD) mounted on vehicles such as an automobile and an airplane. Besides, the head mounted display may be configured as a head mounted display incorporated in a body protector such as a helmet. The head mounted display may be configured as a hand held display.

Figure 19A:
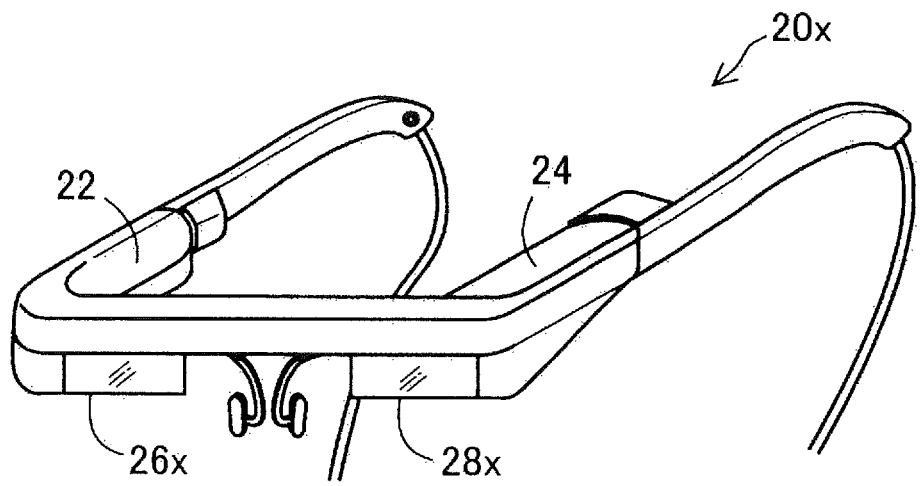
FIGS. 19A and 19B are explanatory diagrams showing the configurations of the external appearances of head mounted displays in modifications.
Figure 19B:
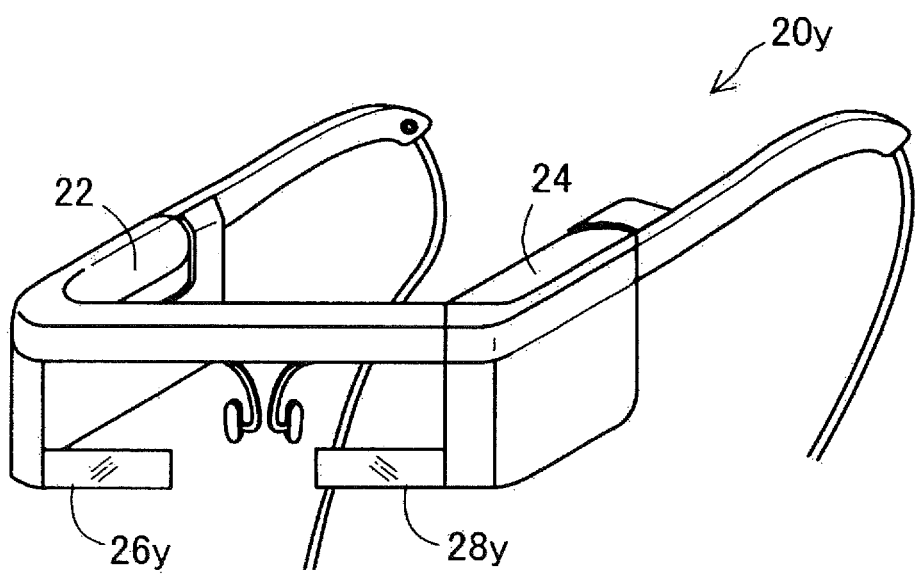

FIGS. 19A and 19B are explanatory diagrams showing the configurations of the external appearances of head mounted displays in modifications. In an example shown in FIG. 19A, an image display unit $20x$ includes a right optical-image display unit $26x$ instead of the right optical-image display unit $26$ and includes a left optical-image display unit $28x$ instead of the left optical-image display unit $28$. The right optical-image display unit $26x$ and the left optical-image display unit $28x$ are formed smaller than the optical members in the first embodiment and arranged obliquely above the right eye and the left eye of the user during wearing of the head mounted display. In an example shown in FIG. 19B, an image display unit $20y$ includes a right optical-image display unit $26y$ instead of the right optical-image display unit $26$ and includes a left optical-image display unit $28y$ instead of the left optical-image display unit $28$. The right optical-image display unit $26y$ and the left optical-image display unit $28y$ are formed smaller than the optical members in the first embodiment and arranged obliquely below the right eye and the left eye of the user during wearing of the head mounted display. In this way, the optical-image display units only have to be arranged near the eyes of the user. The size of the optical members forming the optical-image display units is arbitrary. The head mounted display can also be implemented as a head mounted display of a form in which the optical-image display units cover only a part of the eyes of the user, in other words, a form in which the optical-image display units do not completely cover the eyes of the user.

For example, in the embodiments, the display driving units are configured using the backlights, the backlight control units, the LCDs, the LCD control units, and the projection optical systems. However, the form is only an example. The display driving units may include components for implementing other systems in addition to or instead of these components. For example, the display driving units may include displays of organic EL (Electro-Luminescence), organic EL control units, and projection optical systems. For example, in the display driving units, digital micro-mirror devices or the like can also be used instead of the LCDs. For example, the invention can also be applied to a head mounted display of a laser retinal projection type.

For example, the functional units such as the generating unit, the notifying unit, the image processing unit, the display control unit, and the sound processing unit are described as being implemented by the CPU expanding the computer program, which is stored in the ROM or the hard disk, on the RAM and executing the computer program. However, these functional units may be configured using ASICs (Application Specific Integrated Circuits) designed to implement the functions of the functional units.

Modification 3

In the embodiments, the example of the integrated image display processing is explained. However, the procedure of the integrated image display processing is only an example.

Various modifications are possible. For example, a part of the steps may be omitted or still other steps may be added. The order of the steps to be executed may be changed.

For example, the generating unit may dynamically change the size of the thumbnail display regions B1 to B6 according to the distances between the external devices from which the identification images are acquired and the head mounted display. Consequently, the user who visually recognizes the integrated image can learn the distances between the head mounted display (the image display device) and the plurality of external devices according to the sizes of the images in the thumbnail display regions B1 to B6 (the first display regions).

In the embodiment, the generating unit does not update the thumbnail display regions B1 to B6 (the first display regions). However, the generating unit may update the thumbnail display regions B1 to B6 (the first display regions) according to occurrence of a predetermined trigger. The predetermined trigger can be arbitrarily set. The predetermined trigger can be, for example, occurrence of request operation by the user, occurrence of a predetermined motion of the user, elapse of a predetermined time from the last integrated image generation, or occurrence of an internal request from an OS of the head mounted display or other applications. Consequently, the generating unit can update the first display regions only when the predetermined trigger occurs. Therefore, it is possible to reduce communication traffic between the head mounted display (the image display device) and the external devices.

For example, as the identification images and the integrated image explained in the embodiments, two-dimensionally represented images are assumed. However, the image processing unit may set image data for right eye and image data for left eye as different data to three-dimensionally represent the identification images and the integrated images. In this case, for example, a parallax may be given to each of the identification images according to the distances between the user and the external devices. Specifically, concerning an identification image of an external device having a large distance to the user, a parallax may be given such that the identification image is visually recognized as far. Concerning an identification image of an external device having a small distance to the user, a parallax may be given such that the identification image is visually recognized as close.

In the embodiments, the control unit generates the integrated image including the first display regions and the second display region and causes the image display unit to display the integrated image. However, the integrated image only has to be displayed by the image display unit. The control unit does not always need to "generate" the integrated image. Specifically, for example, the control unit separately generates an image representing the first display regions and an image representing the second display region. The control unit transmits the generated image representing the first display regions to the image processing unit as, for example, image data for right eye. Similarly, the control unit transmits the generated image representing the second display region to the image processing unit as, for example, image data for left eye. The control unit may cause the image display unit to display the separate images together to display the integrated image.

For example, when external devices exceeding the number of the thumbnail display regions B1 to B6 are present or when external devices exceeding the number of thumbnail display regions are designated, external devices (identification images) to be displayed in the thumbnail display regions may be selected according to a predetermined standard. As the predetermined standard, for example, a frequency of selection by the user or date and time when an identification image is added to the thumbnail display regions can be used.

When the additional processing 1 is applied to the integrated image display processing, the generating unit may cause the storing unit to store at least a history of external devices to which the user directed attention in the past. In this case, the generating unit may assist selection of an external device by the user using the stored history. The generating unit may automatically arrange identification images of the external devices stored in the history in the thumbnail display regions B1 to B6.

In the integrated image display processing in the fourth embodiment, the server may acquire in advance an image of the display screen of the head mounted display and images of the display surfaces of the external devices. Then, it is possible to reduce time in which the server sequentially acquires these images. Therefore, it is possible to display an integrated image.

Modification 4

In the embodiments, the example of the integrated image update processing is explained. However, the procedure of the integrated image update processing is only an example. Various modifications are possible. For example, a part of the steps may be omitted or still other steps may be added. The order of the steps to be executed may be changed.

For example, in step S200, the updating unit 144 may acquire, instead of selection operation of one external device, any one of a head coordinate of one thumbnail display region (first display region) selected by the user of the head mounted display and an identifier of one thumbnail display region (first display region) selected by the user. In this way, it is possible to obtain effects same as the effects in the embodiments.

For example, external devices selectable by the user in step S200 may be limited to external devices that satisfy a predetermine condition among the plurality of external devices connected to the head mounted display. As the predetermined condition, for example, an information amount of identification images of the external devices can be used. According to the condition, the PC and the AV device having large information amounts of identification images could be selection targets in step S200. However, the home electric appliance having a small information amount of an identification image is not a selection target in step S200.

For example, the integrated image update processing may be omitted. In this case, operation of the external devices may be enabled via operation by the user (operation performed using the visual line or the fingertip) on the identification images displayed in the thumbnail display regions (the first display regions).

Modification 5

In the embodiments, the example of the region information is explained. The region information is only an example. Various changes are possible. For example, addition, deletion, and a change of components can be performed.

Figure 20:
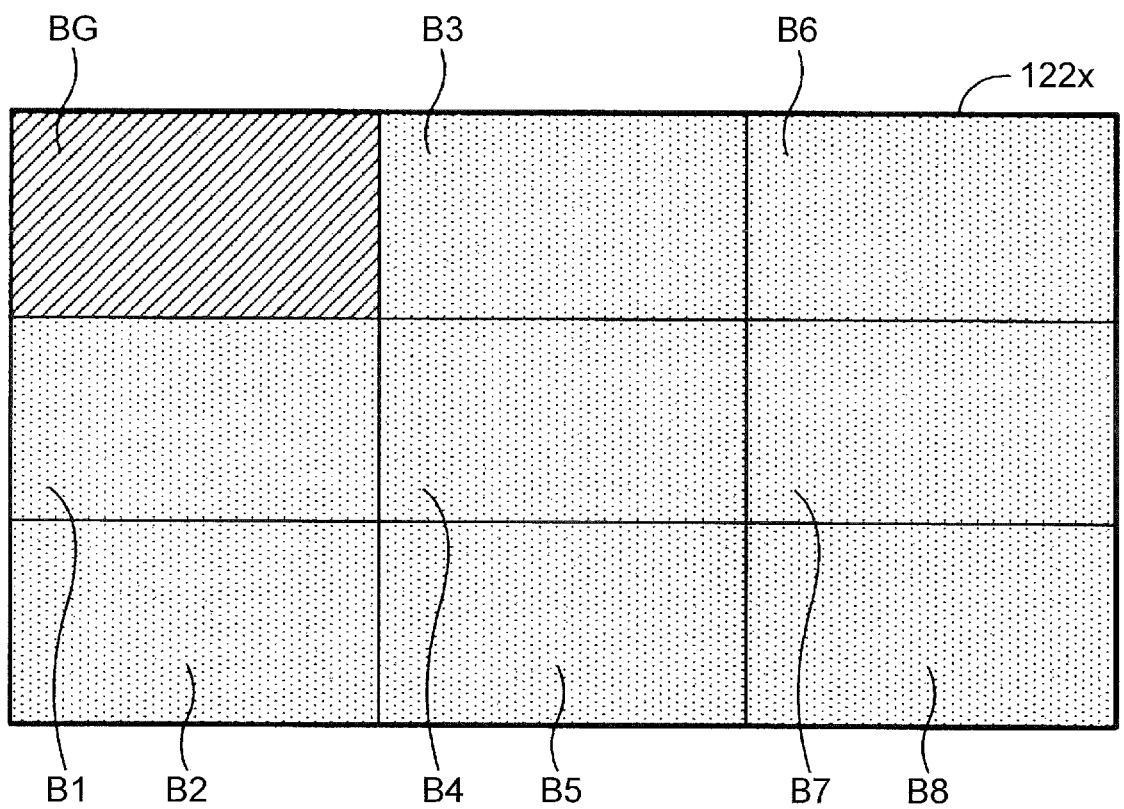
FIG. 20 is an explanatory diagram showing an example of region information in a modification.

FIG. 20 is an explanatory diagram showing an example of region information 122x in a modification. Like the region information 122 shown in FIG. 3, the region information 122x includes a rectangular region (hereinafter referred to as "region 122" as well) having an aspect ratio same as an aspect ratio of a display device of the head mounted display. The region 122 includes eight thumbnail display regions B1 to B8 and the active display region BG. When the region 122 is equally divided in the vertical direction and the horizontal direction, the active display region BG is arranged at the upper left end of the divided regions. The eight thumbnail display regions B1 to B8 are arranged in order in the remaining divided regions of the region 122. When the region information 122x is used, it is possible to obtain effects same as the effects in the embodiments.

In the embodiments, for example, the region information includes one active display region. However, the region information may include a plurality of (two or more) active display regions. For example, in the region information 122 shown in FIG. 3, it is also possible that the region 122 is equally divided into two in the horizontal direction, the upper side is set as a first active display region, and the lower side is set as a second active display region. Similarly, it is also possible that the region 122 is equally divided into two in the vertical direction, the left side is set as the first active display region, and the right side is set as the second active display region. In this case, it is also possible that, for example, in the integrated image display processing, a display image of one external device selected by the user first is arranged in the first active display region and a display image of one external device selected next is arranged in the second active display region.

For example, a plurality of different kinds of region information may be stored in the storing unit. In this case, one region information used for generation of an integrated image may be selected from the plurality of different kinds of region information according to an arbitrary condition such as preference (setting) of the user of the head mounted display, the movement of the visual line of the user, the movement of the head of the user, or ambient brightness.

Modification 6

The invention is not limited to the embodiments, the examples, and the modifications and can be implemented in various configurations without departing from the spirit of the invention. For example, the technical features of the embodiments, the examples, and the modifications corresponding to the technical features in the forms described in the summary of the invention can be replaced or combined as appropriate in order to solve a part or all of the problems or in order to attain a part or all of the effects. Unless the technical features are explained as essential features in this specification, the technical features can be deleted as appropriate.

The entire disclosure of Japanese Patent Application Nos. 2013-198132 Sep. 25, 2013 and 2014-112601, filed May 30, 2014 are expressly incorporated by reference herein.

What is claimed is:

1. A head-mounted display device comprising:
a camera that picks up an outside scene image;
a transmissive-type display configured to display virtual imagery while allowing real world scenery to be seen through the transmissive-type display; and
a processor or application specific integrated circuit (ASIC) configured to:
    establish connections between the head-mounted display device and a plurality of external devices, respectively, the plurality of external devices being provided respective markers;
    for each one of the plurality of external devices that a connection is established for:
        acquire, from the one of the plurality of external devices that the connection is established for, information identifying the one of the plurality of external devices that the connection is established for;
        generate, based on the information identifying the one of the plurality of external devices that the connection is established for, an identification image for distinguishing the one of the plurality of external devices that the connection is established for from the other plurality of external devices connected to the head-mounted display device, wherein the identification image comprises a frame image of a screen including multiple contents for operating the one of the plurality of external devices displayed by the one of the plurality of external devices; and
        cut the connection between the head-mounted display device and the one of the plurality of external devices that the connection was established for;
    generate a first integrated image including a first display region including the identification images generated for each of the plurality of external devices that were connected to the head-mounted display device organized as a list, each identification image identifying one of the plurality of external devices that were connected to the head-mounted display device;
    cause the transmissive-type display to display the first integrated image;
    detect one of the markers in the outside scene image captured by the camera;
    make a selection of one of the plurality of external devices based on the detected marker;
    generate a second integrated image including another first display region including another plurality of identification images organized as another list, and a second display region where a display image is displayed by:
        requesting the display image from the selected one of the plurality of external devices;
        receiving the display image, which is a frame image obtained by the selected one of the plurality of external devices by rendering an image of a display screen of the selected one of the plurality of external devices that is currently displayed, wherein the respective identification images are superimposed on the display image in the second integrated image; and
    cause the transmissive-type display to display the second integrated image.

2. The head-mounted display device according to claim 1, wherein the processor or ASIC is further configured to:
repeatedly acquire the display image from the one external device corresponding to the selection of the one of the plurality of external devices until a different one of the plurality of external devices is selected; and
repeatedly update the second display region of the second integrated image using the acquired display image until a different one of the plurality of external devices is selected.

3. The head-mounted display device according to claim 1, wherein the identification images include at least one of: an image displayed at one point in time on the one external device that the connection is established for, an image representing information for identifying the one external device that the connection is established for, and an image representing a symbol allocated to the one external device that the connection is established for.

4. The head-mounted display device according to claim 1, wherein the processor or ASIC is further configured to:

acquire distances between the head-mounted display device and each of the plurality of external devices, and determine, according to the acquired respective distances, at least one of: a display order of the plurality of identification images in the first display regions and a size of the identification images in the first display regions.

5. The head-mounted display device according to claim 1, wherein the processor or ASIC is further configured to: cause the transmissive-type display to update the first display regions.

6. The head-mounted display device according to claim 1, wherein the processor or ASIC is further configured to cause the transmissive-type display to:

generate image light representing the first integrated image, and emit the generated image light to eyes of the user to cause the user to visually recognize the first integrated image.

7. The head-mounted display device according to claim 6, wherein the processor or ASIC is further configured to:

set an aspect ratio of the second display region as an aspect ratio of a generable region of image light to be generated by the transmissive-type display, generate the second integrated image in which the another first display region is arranged on an outer side of the second display region, when there is no operation by the user, cause the transmissive-type display to generate the image light of a portion of the second integrated image equivalent to the second display region, and when there is an operation by the user, cause the display to generate at least the image light of a portion of the integrated image equivalent to the another first display region.

8. The head-mounted display device according to claim 6, wherein the processor or ASIC is further configured to:

generate image light representing information for additional presentation to be added to the one external device corresponding to the selection of the one of the plurality of external devices and for providing the user with augmented reality, and cause the transmissive-type display to emit the generated image light to the eyes of the user to cause the user to visually recognize the information for additional presentation.

9. The head-mounted display device according to claim 1, wherein the processor or ASIC is further configured to: dynamically update the display image of the one external device corresponding to the selection of the one of the plurality of external devices.

10. A method of controlling a head-mounted display device including a camera that picks up an outside scene image, the method comprising:

establishing connections between the head-mounted display device and a plurality of external devices, respectively, the plurality of external devices being provided respective markers;

for each one of the plurality of external devices that a connection is established for:

acquiring, from the one of the plurality of external devices that the connection is established for, information identifying the one of the plurality of external devices that the connection is established for;

generating, based on the information identifying the one of the plurality of external devices that the connection is established for, an identification image for distinguishing the one of the plurality of external devices that the connection is established for from the other plurality of external devices connected to the head-mounted display device, wherein the identification image comprises a frame image of a screen including multiple contents for operating the one of the plurality of external devices displayed by the one of the plurality of external devices; and cutting the connection between the head-mounted display device and the one of the plurality of external devices that the connection was established for;

generating a first integrated image including a first display region including the identification images generated for each of the plurality of external devices that were connected to the head-mounted display device organized as a list, each identification image identifying one of the plurality of external devices that were connected to the head-mounted display device;

causing the transmissive-type display to display the first integrated image;

detecting one of the markers in the outside scene image captured by the camera;

making a selection of one of the plurality of external devices based on the detected marker;

generating a second integrated image including another first display region including another plurality of identification images organized as another list, and a second display region where a display image is displayed by:

requesting the display image from the selected one of the plurality of external devices;

receiving the display image, which is a frame image obtained by the selected one of the plurality of external devices by rendering an image of a display screen of the selected one of the plurality of external devices that is currently displayed, wherein the respective identification images are superimposed on the display image in the second integrated image; and causing the transmissive-type display to display the second integrated image.

11. A non-transitory computer readable medium comprising computer-executable instructions that, when executed by a computer, cause the computer to:

establish connections between a head-mounted display device and a plurality of external devices, respectively, the plurality of external devices being provided respective markers;

for each one of the plurality of external devices that a connection is established for:

acquire, from the one of the plurality of external devices that the connection is established for, information identifying the one of the plurality of external devices that the connection is established for;

generate, based on the information identifying the one of the plurality of external devices that the connection is established for, an identification image for distinguishing the one of the plurality of external devices that the connection is established for from the other plurality of external devices connected to the head-mounted display device, wherein the identification image comprises a frame image of a screen including multiple contents for operating the one of the plurality of external devices displayed by the one of the plurality of external devices; and cut the connection between the head-mounted display device and the one of the plurality of external devices that the connection was established for;

generate a first integrated image including a first display region including the identification images generated for each of the plurality of external devices that were connected to the head-mounted display device organized as a list, each identification image identifying one of the plurality of external devices that were connected to the head-mounted display device;

cause the transmissive-type display to display the first integrated image;

detect one of the markers in an outside scene image captured by a camera of the head-mounted display device;

make a selection of one of the plurality of external devices based on the detected marker;

generate a second integrated image including another first display region including another plurality of identification images organized as another list, and a second display region where a display image is displayed by:
 requesting the display image from the selected one of the plurality of external devices;
 receiving the display image, which is a frame image obtained by the selected one of the plurality of external devices by rendering an image of a display screen of the selected one of the plurality of external devices that is currently displayed, wherein the respective identification images are superimposed on the display image in the second integrated image; and cause the transmissive-type display to display the second integrated image.

12. A head-mounted display system comprising:

an information processing device;

a head-mounted display device connected to the information processing device, the head-mounted display device comprising a transmissive-type display configured to display virtual imagery while allowing real world scenery to be seen through the transmissive-type display, and including a camera that picks up an outside scene image; and a plurality of external devices connected to the information processing device, wherein
 the information processing device includes:
  a processor or application specific integrated circuit (ASIC) configured to:
   establish connections between the head-mounted display device and the plurality of external devices, respectively, the plurality of external devices being provided respective markers;
   for each one of the plurality of external devices that a connection is established for:
    acquire, from the one of the plurality of external devices that the connection is established for, information identifying the one of the plurality of external devices that the connection is established for;
    generate, based on the information identifying the one of the plurality of external devices that the connection is established for, an identification image for distinguishing the one of the plurality of external devices that the connection is established for from the other plurality of external devices connected to the head-mounted display device, wherein the identification image comprises a frame image of a screen including multiple contents for operating the one of the plurality of external devices displayed by the one of the plurality of external devices; and
    cut the connection between the head-mounted display device and the one of the plurality of external devices that the connection was established for;

generate a first integrated image including a first display region including the identification images generated for each of the plurality of external devices that were connected to the head-mounted display device organized as a list, each identification image identifying one of the plurality of external devices that were connected to the head-mounted display device;

cause the transmissive-type display to display the first integrated image;

detect one of the markers in the outside scene image captured by the camera;

make a selection of one of the plurality of external devices based on the detected marker;

generate a second integrated image including another first display region including another plurality of identification images organized as another list, and a second display region where a display image is displayed by:
 requesting the display image from the selected one of the plurality of external devices;
 receiving the display image, which is a frame image obtained by the selected one of the plurality of external devices by rendering an image of a display screen of the selected on of the plurality of external devices that is currently displayed, wherein the respective identification images are superimposed on the display image in the second integrated image; and cause the transmissive-type display to display the second integrated image.

* * * * *